US012776101B2

(12) United States Patent
Wald

(10) Patent No.: US 12,776,101 B2
(45) Date of Patent: Oct. 27, 2026

(54) MULTI-DIMENSIONAL BINNING FOR HIERARCHICAL PARTITIONING

(71) Applicant: NVIDIA Corporation, Santa Clara, CA (US)

(72) Inventor: Ingo Wald, Salt Lake City, UT (US)

(73) Assignee: NVIDIA Corporation, Santa Clara, CA (US)

( * ) Notice: Subject to any disclaimer, the term of this patent is extended or adjusted under 35 U.S.C. 154(b) by 255 days.

(21) Appl. No.: 18/437,071

(22) Filed: Feb. 8, 2024

(65) Prior Publication Data

US 2025/0259384 A1 Aug. 14, 2025

(51) Int. Cl.
*G06T 17/00* (2006.01)

(52) U.S. Cl.
CPC ........ *G06T 17/005* (2013.01); *G06T 2210/21* (2013.01)

(58) Field of Classification Search
CPC .... G06T 17/005; G06T 2210/21; G06T 15/06
See application file for complete search history.

(56) References Cited

U.S. PATENT DOCUMENTS 8,471,845 B1 * 6/2013 Stich ........................ G06T 15/06 345/426
9,990,758 B2 * 6/2018 Ganestam ............. G06T 15/005
2012/0313944 A1 * 12/2012 Kontkanen ........... G06T 15/506 345/426
2013/0235031 A1 9/2013 Karras
2013/0249915 A1 * 9/2013 Stich ...................... G06T 17/005 345/426
2014/0362074 A1 * 12/2014 Karras .................... G06T 15/06 345/419
2014/0365529 A1 12/2014 Aila et al.
2014/0365532 A1 * 12/2014 Karras ................ G06F 16/2246 707/803

OTHER PUBLICATIONS

Pantaleoni, et al.; "HLBVH: Hierarchical LBVH Construction for Real-Time Ray Tracing of Dynamic Geometry," High Performance Graphics (2010), 9 pgs. (Year: 2010).*
Pantaleoni, et al.; "HLBVH: Hierarchical LBVH Construction for Real-Time Ray Tracing of Dynamic Geometry," High Performance Graphics (2010), 9 pgs. (Year: 2020).*

* cited by examiner

*Primary Examiner* — Michael Le
(74) *Attorney, Agent, or Firm* — IRON SUMMIT IP LLP

(57) ABSTRACT

In various examples, spatial elements of a scene may be projected into multi-dimensional bins that correspond to a spatial partitioning of the scene to determine assignments between the spatial elements and the multi-dimensional bins. A partition of the spatial elements may be determined using the assignments and a spatial element may be assigned to a node corresponding to a hierarchical partitioning of the spatial elements based on the partition. To determine the partition, candidate split planes may be determined with respect to the multi-dimensional bins, and a split plane that defines the partition may be selected from the candidate split planes. The assignments and the multi-dimensional bins may also be used to determine subpartitions of the partition. For example, the assignments may be used to determine the subpartitions with respect to a subset of the multi-dimensional bins that corresponds to the partition.

20 Claims, 17 Drawing Sheets

MULTI-DIMENSIONAL BINNING FOR HIERARCHICAL PARTITIONING

BACKGROUND

Bounding Volume Hierarchies (BVHs) may be used to accelerate ray intersection testing with scene (e.g., object) geometries for light transport simulation techniques when rendering images of scenes. BVHs are used to organize the geometry of a scene into a hierarchical tree-like structure, where a node may represent a bounding volume that encloses a portion of the scene. As a ray traverses a hierarchy of a BVH, for rays that do not intersect with a node's bounds, the subtree beneath that node (representing a region of the scene) in the hierarchy can be discarded from further testing, thereby reducing the number of intersection tests used to test for an intersection with the geometry of the scene. When the scene geometry changes, a new BVH may need to be built or a previous BVH may be modified to reflect updated scene conditions. However, a slow building process for a BVH can be a bottleneck in performing the light transport simulation.

A typical approach to building a BVH for a frame involves a recursive process in which a set of primitives for a node are partitioned into multiple subsets. The partitioning may be achieved using a split plane that separates the primitives into sets for new nodes, then repeating the process on those nodes until a leaf node is reached. Each time a split plane is to be determined, the primitives may be read from memory, and for each axis (e.g., an x-axis, a y-axis, and a z-axis), projected into bins or buckets along the axis to determine split plane candidates along that axis. The split plane for a node may then be selected from the split plane candidates from multiple axes using a cost function, such as a Surface Area Heuristic (SAH). However, such a process may be performed for each frame of a scene as the viewport of the viewer/user changes; as scenes often include a large quantity of primitives, this approach may consume significant memory bandwidth, which may greatly reduce the build speed for the BVH.

SUMMARY

Embodiments of the present disclosure relate to multi-dimensional binning for hierarchical partitioning. Systems and methods are disclosed that may be used to reduce the bandwidth required to read spatial elements from memory to determine hierarchical partitionings of spatial elements of a scene.

In contrast to conventional systems, such as those described above, spatial elements of a scene may be projected into multi-dimensional bins that correspond to a spatial partitioning of the scene to determine assignments between the spatial elements and the multi-dimensional bins. One or more partitions of the spatial elements may then be determined based at least on one or more values indicating the assignments, and at least one spatial element of the spatial elements may be assigned to a node corresponding to a hierarchical partitioning of the spatial elements based at least on the partition. In at least one embodiment, a partition may be determined based at least on selecting one or more split planes that define the partition. For example, one or more candidate split planes may be determined with respect to one or more dimensions of the multi-dimensional bins. The candidate split planes may be evaluated using the one or more values, and the one or more split planes may be selected based at least on the evaluation. In at least one embodiment, the assignments and the multi-dimensional bins may be used to determine one or more subpartitions of the one or more partitions. For example, the assignments may be used to determine the one or more subpartitions with respect to a subset of the multi-dimensional bins that corresponds to a partition. Similar to a partition, a subpartition may be determined based at least on selecting one or more split planes that define the subpartition(s).

BRIEF DESCRIPTION OF THE DRAWINGS

The present systems and methods for multi-dimensional binning for hierarchical partitioning are described in detail below with reference to the attached drawing figures, wherein.

DETAILED DESCRIPTION

Figure 1:
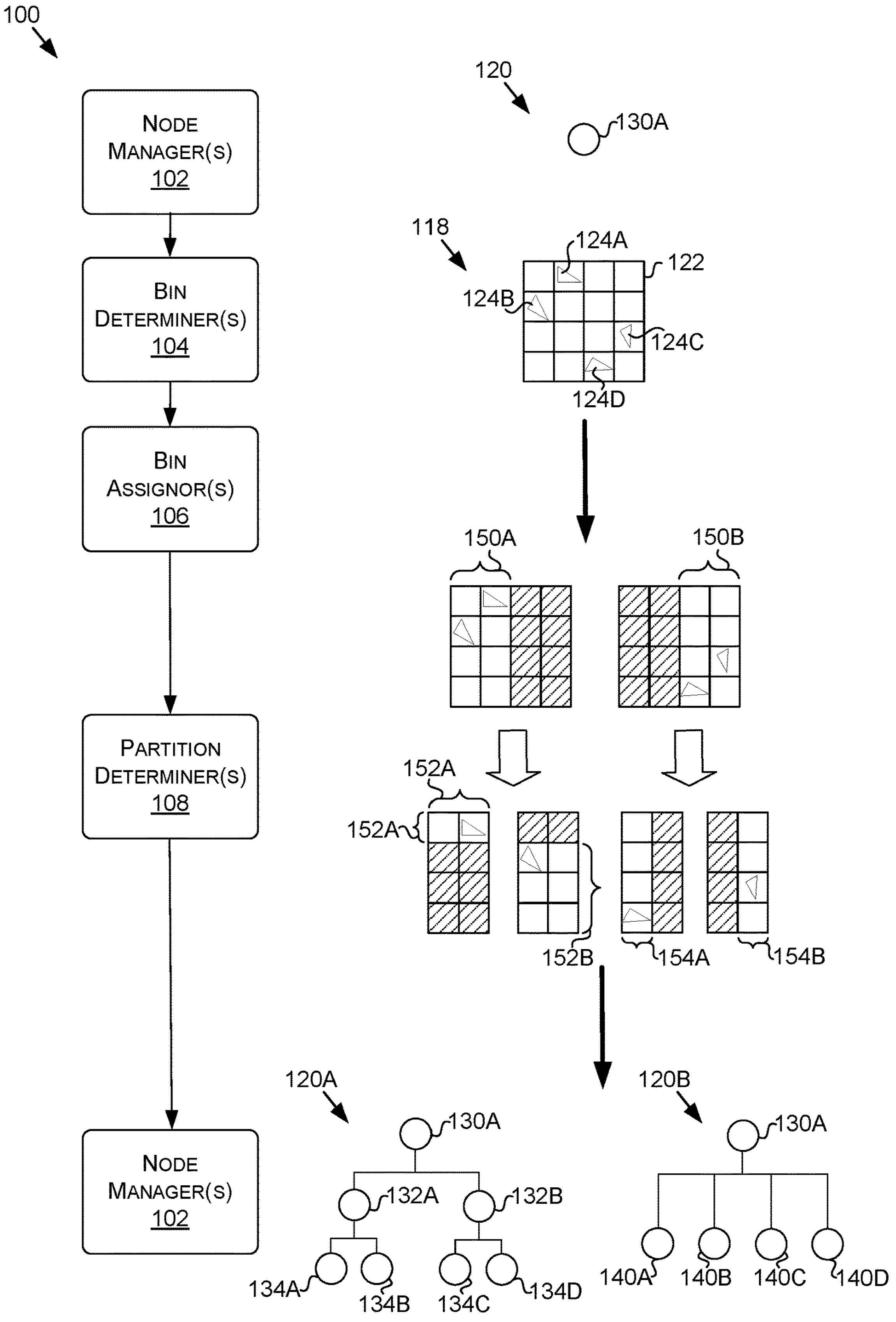
FIG. 1 is an example of a process for determining a hierarchical partitioning of spatial elements using multi-dimensional binning, in accordance with some embodiments of the present disclosure.

Systems and methods are disclosed related to multi-dimensional binning for hierarchical partitioning. Disclosed approaches may be used to reduce the bandwidth required to read spatial elements from memory to determine hierarchical partitionings of spatial elements of a scene.

In accordance with disclosed approaches, spatial elements (e.g., primitives) of a scene may be projected into multi-dimensional bins that correspond to a spatial partitioning of the scene to determine assignments between the spatial elements and the multi-dimensional bins. One or more partitions of the spatial elements may then be determined based at least on one or more values indicating the assignments and at least one spatial element of the spatial elements may be assigned to a node corresponding to a hierarchical partitioning of the spatial elements based at least on the partition. In at least one embodiment, a partition may be determined based at least on selecting one or more split planes that define the partition. For example, one or more candidate split planes may be determined with respect to one or more dimensions of the multi-dimensional bins (e.g., along an X-axis, a Y-axis, or a Z-axis). The candidate split planes may be evaluated using the one or more values, such as counters of the quantity of spatial elements assigned to the bins, merged bounding boxes of the spatial elements assigned to the bins, etc., and the one or more split planes may be selected based at least on the evaluation.

In at least one embodiment, the assignments and the multi-dimensional bins may be used to determine one or more subpartitions of the one or more partitions. For example, the one or more values indicating the assignments may be used to determine the one or more subpartitions with respect to a subset of the multi-dimensional bins that corresponds to partition. Similar to a partition, a subpartition may be determined based at least on selecting one or more split planes that define the subpartition(s). For example, one or more candidate split planes may be determined with respect to one or more dimensions of the subset of the multi-dimensional bins (e.g., along an X-axis, a Y-axis, or a Z-axis). The candidate split planes may be evaluated using the one or more values, such as counters of the quantity of spatial elements assigned to the bins, merged bounding boxes of the spatial elements assigned to the bins, etc., and the one or more split planes may be selected based at least on the evaluation.

In at least one embodiment, one or more spatial elements that correspond to a subpartition of a partition of spatial elements may be assigned to a child node to a parent node that corresponds to the partition in the hierarchical partitioning of the spatial elements. Additionally, or in the alternative, the one or more spatial elements that correspond to the subpartition of the partition of spatial elements may be assigned to a child node to a parent node that corresponds to the spatial elements.

The hierarchical partitioning may be used to perform any of a variety of light transport simulation operations on graphical data, such as path tracing, ray tracing, ray marching, etc. By way of example, and not limitation, the hierarchical partitioning may correspond to an acceleration structure, such as a Bounding Volume Hierarchy (BVH) using for intersection testing in light transport simulation. However, the hierarchical partitioning may be used for additional or alternative applications.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, object or actor simulation and/or digital twinning, data center processing, conversational AI, light transport simulation (e.g., ray tracing, path tracing, etc.), collaborative content creation for 3D assets, cloud computing, generative AI, (large) language models, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, systems for performing generative AI operations, systems for performing operations using a large language model, and/or other types of systems.

With reference to FIG. 1, FIG. 1 is an example of a process 100 for determining a hierarchical partitioning of spatial elements using multi-dimensional binning, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In at least one embodiment, the systems, methods, and processes described herein may be executed using similar components, features, and/or functionality to those of the parallel processing unit 700 of FIG. 7, the general processing clusters 750 of FIG. 8A, the memory partition unit 780 of FIG. 8B, the streaming multiprocessor 840 of FIG. 9A, the processing system 900 of FIG. 9B, the system 965 of FIG. 9C, the computing device 1300 of FIG. 13, and/or the data center 1400 of FIG. 14.

The process 100 may be implemented using, amongst additional or alternative components, one or more node managers 102, one or more bin determiners 104, one or more bin assignors 106, or one or more partition determiners 108.

As an overview, the node manager 102 may be configured to manage nodes of a hierarchical partitioning of a scene, such as a hierarchical partitioning 120, which may include modifying, creating, and/or deleting one or more nodes. The bin determiner 104 may be configured to determine and/or generate multi-dimensional bins that correspond to a spatial partitioning of the scene, such as multi-dimensional bins 122. The bin assignor 106 may be configured to assign one or more spatial elements to one or more of the multi-dimensional bins, such as a spatial element 124A, a spatial element 124B, a spatial element 124C, or a spatial element 124D (also referred to as "spatial elements 124"), for example, based at least on projecting the spatial elements into the multi-dimensional bins. The partition determiner 108 may be configured to determine one or more partitions of the spatial elements based at least on one or more assignments between the one or more spatial elements and the one or more multi-dimensional bins determined using the bin assignor 106. The node manager 102 may be configured to assign at least one of the spatial elements to a node of the hierarchical partitioning or otherwise update or generate the hierarchical partitioning based at least on the one or more partitions determined using the partition determiner 108. In at least one embodiment, the process 100 is implemented using a recursive process for determining the hierarchical partitioning 120. The recursive process may include recursively partitioning spatial elements of a node to determine child nodes for the hierarchical partitioning 120 until a leaf node is determined and/or an end condition it satisfied for the recursion.

A hierarchical partitioning determined using the process 100 may be used to render an image of a scene using any of a variety of rendering techniques. For example, the hierarchical partitioning 120 may be used to perform any of a variety of light transport simulation operations on graphical data, such as path tracing, ray tracing, ray marching, etc. By way of example, and not limitation, the hierarchical partitioning may correspond to the acceleration structure 1100 of FIG. 11 and may be used in the ray tracing pipeline 1000 of FIG. 10.

In at least one embodiment, the hierarchical partitioning, such as the partitioning 120, includes a Bounding Volume Hierarchy (BVH). However, the process 100 may be used to determine other types of partitionings of spatial elements. Examples of the spatial elements include one or more primitives, spheres, cubes, triangles, quadrilaterals, tetrahedra, points, lines, curves, polylines, polygons, parametric shapes, polyhedrons, volumetric regions, surfaces, meshes, models, points of a point cloud, voxels, particles, Bezier patches, Non-Uniform Rational B-Spline (NURB) surfaces, implicit surfaces, fractal shapes, textured surfaces, and/or parametric surfaces. However, the partitioning 120 may include other types of data structures and/or may be used to partition other types of data. As various examples, the partitioning 120 may include one or more of an r-tree, a k-d tree, a geohash, a grid index, or a spatial hashing. Further examples of data types for the spatial elements include N-dimensional points, geographic data (e.g., geographic features, geographic coordinates or objects), sensor data (e.g., sensor readings), biological data, database data (e.g., entries, records, or elements), vector data, etc. For example, disclosed hierarchical partitionings may be used to accelerate database operations (e.g., data access) for spatially indexed data elements. While a scene is primarily described herein, the scene may also refer to a space which includes the spatial elements.

As described herein, the node manager 102 may be configured to manage nodes of the hierarchical partitioning 120 of a scene 118, which may include modifying, creating, and/or deleting one or more nodes. The hierarchical partitioning 120 may generally include one or more nodes. For example, the hierarchical partitioning 120A may refer to a version of the hierarchical partitioning 120 that includes a node 130A, a node 132A, a node 132B, a node 134A, a node 134B, a node 134C, and a node 134D.

Figure 2:
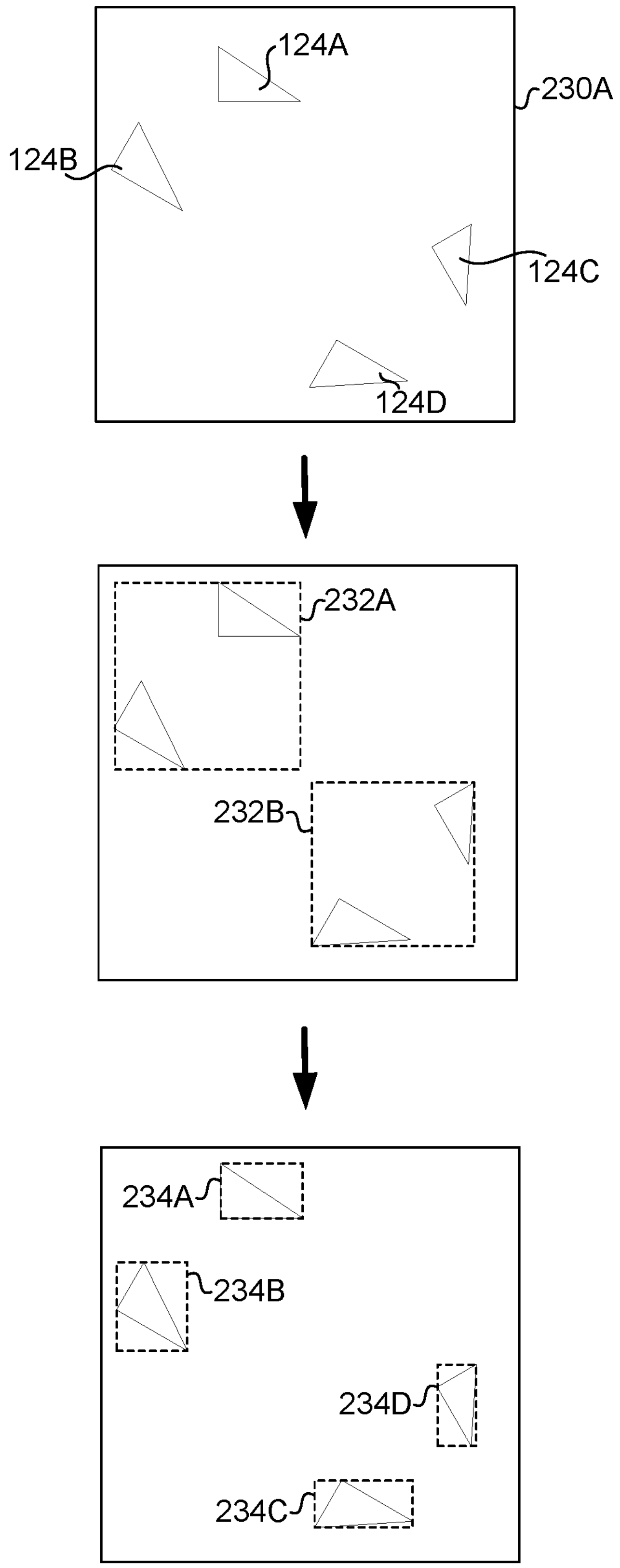
FIG. 2 is an example of a diagram illustrating bounding shapes which may be associated with a hierarchical partitioning of spatial elements, in accordance with some embodiments of the present disclosure.

A node of the hierarchical partitioning 120 may include, for example, one or more values (e.g., one or more bounding shape coordinates and/or dimensions) indicating one or more bounding volumes or shapes that encloses (e.g., tightly encloses) one or more spatial elements that correspond to the node. Referring to FIG. 2 with FIG. 1, FIG. 2 is an example of a diagram illustrating bounding shapes which may be associated with a hierarchical partitioning of spatial elements, in accordance with some embodiments of the present disclosure. FIG. 2 shows a bounding shape 230A which may correspond to the node 130A of the hierarchical partitioning 120A. In the example shown, the node 130A may correspond to a root node of the hierarchical partitioning 120. In other examples, the node 130A may correspond to a different type of node of the hierarchical partitioning 120, such as an internal node or a leaf node.

In examples where the node 130A corresponds to a root node, the node 130A may refer to a top-level node of the hierarchical partitioning 120, which may encompass the entire scene 118, object, or region being partitioned. In at least one embodiment, a root node may serve as a starting point for determining the hierarchical partitioning 120 and indicate a bounding volume or shape that encloses all the spatial elements in the scene 118. For example, the scene 118 may include any number of spatial elements, examples of which include the spatial elements 124.

A node of the hierarchical partitioning 120 may also include, for example, one or more values (e.g., one or more pointers) indicating one or more children of the node. For example, the node 130A may indicate the node 132A and the node 132B (e.g., internal nodes of the hierarchical partitioning 120) are child nodes to the node 130A. The children of a node may further subdivide the spatial elements 124. For example, the child node 132A may correspond to a bounding shape 232A, which includes the spatial element 124A and the spatial element 124B. The child node 132A may correspond to a bounding shape 232B, which includes the spatial element 124C and the spatial element 124D.

Similarly, the node 132A may indicate the node 134A and the node 134B (e.g., leaf nodes of the hierarchical partitioning 120) are child nodes to the node 132A, and the node 132B may indicate the node 134C and the node 134D (e.g., leaf nodes of the hierarchical partitioning 120) are child nodes to the node 132B. The child node 134A may correspond to a bounding shape 234A, which includes the spatial element 124A, the child node 134B may correspond to a bounding shape 234B, which includes the spatial element 124B, the child node 134C may correspond to a bounding shape 234C, which includes the spatial element 124C, and the child node 134D may correspond to a bounding shape 234D, which includes the spatial element 124D.

A node of the hierarchical partitioning 120 may also include, for example, one or more values (e.g., one or more pointers) indicating one or more spatial elements of the node. For example, the child node 134A indicates the spatial element 124A, the child node 134B may indicate the spatial element 124B, the child node 134C may indicate the spatial element 124C, and the child node 134D may indicate the spatial element 124D. While the various nodes are described as being examples of root, internal, or leaf nodes, they may refer to other types of nodes in the process 100. For example, the node 130A may refer to an internal node and/or one or more of the nodes 134A, 134B, 134C, or 134D may refer to an internal node in one or more embodiments.

The nodes of the hierarchical partitioning 120 may also include addition or alternative information depending on the implementation and requirements of the application, such as, for example, bin information of multi-dimensional bins that correspond to the node (e.g., counters of spatial elements within a bin(s), aggregated bounding boxes of spatial elements within a bin(s), centroid bounds of the spatial elements within a bin(s), etc.), one or more splitting planes that correspond to the node, and/or metadata that may be used for traversal and/or modification of the hierarchical partitioning 120.

To determine the hierarchical partitioning 120, the process 100 may include, for example, the node manager 102 determining (e.g., generating) the node 130A. As an example, the node 130A may correspond to a root node of the hierarchical partitioning 120. The bin determiner 104 may be configured to determine and/or generate multi-dimensional bins that correspond to a spatial partitioning of the scene, such as the multi-dimensional bins 122. For example, the bin determiner 104 may be configured to determine multi-dimensional bins that correspond to a node and/or space of the scene 118 to be partitioned. In the example shown, the bin determiner 104 may be configured to determine and/or generate the multi-dimensional bins 122 corresponding to a spatial partitioning of the node 130A and/or the bounding shape 230A.

The multi-dimensional bins may correspond to any suitable spatial partitioning of the scene. For example, the multi-dimensional bins may include one or more grids and/or cubes enclosing regions of the scene 118. The multi-dimensional bins 122 may, for example, correspond to a spatial partitioning of the bounding shape 230A. The multi-dimensional bins 122 are shown as two-dimensional bins, for example, forming a grid, for simplicity. However, in at least one embodiment, the multi-dimensional bins 122 include three-dimensional bins, for example, forming a cube. Generally, a bin of the multi-dimensional bins may include at least two dimensions. The bins of the multi-dimensional bins 122 may be the same size and/or shape or one or more of the bins may vary in size along one or more dimensions. While FIG. 1 shows that the multi-dimensional bins 122 include sixteen bins, the multi-dimensional bins may include any number of bins. By way of example, for three-dimensions bins, the multi-dimensional bins may include X*Y*Z bins where X refers to the number of bins along the X-axis, Y refers to the number of bins along the Y-axis, and Z refers to the number of bins along the Z-axis. In at least one embodiment, each time the bin determiner 104 determines multi-dimensional bins for a given space to be partitioned, the multi-dimensional bins have a same quantity of bins and/or a same configuration, or different quantities or configurations may be used. For example, the multi-dimensional bins may form a multi-dimensional structure that is sized or scaled to the space to be partitioned (e.g., an 8 by 8 by 8 structure).

Figure 3:
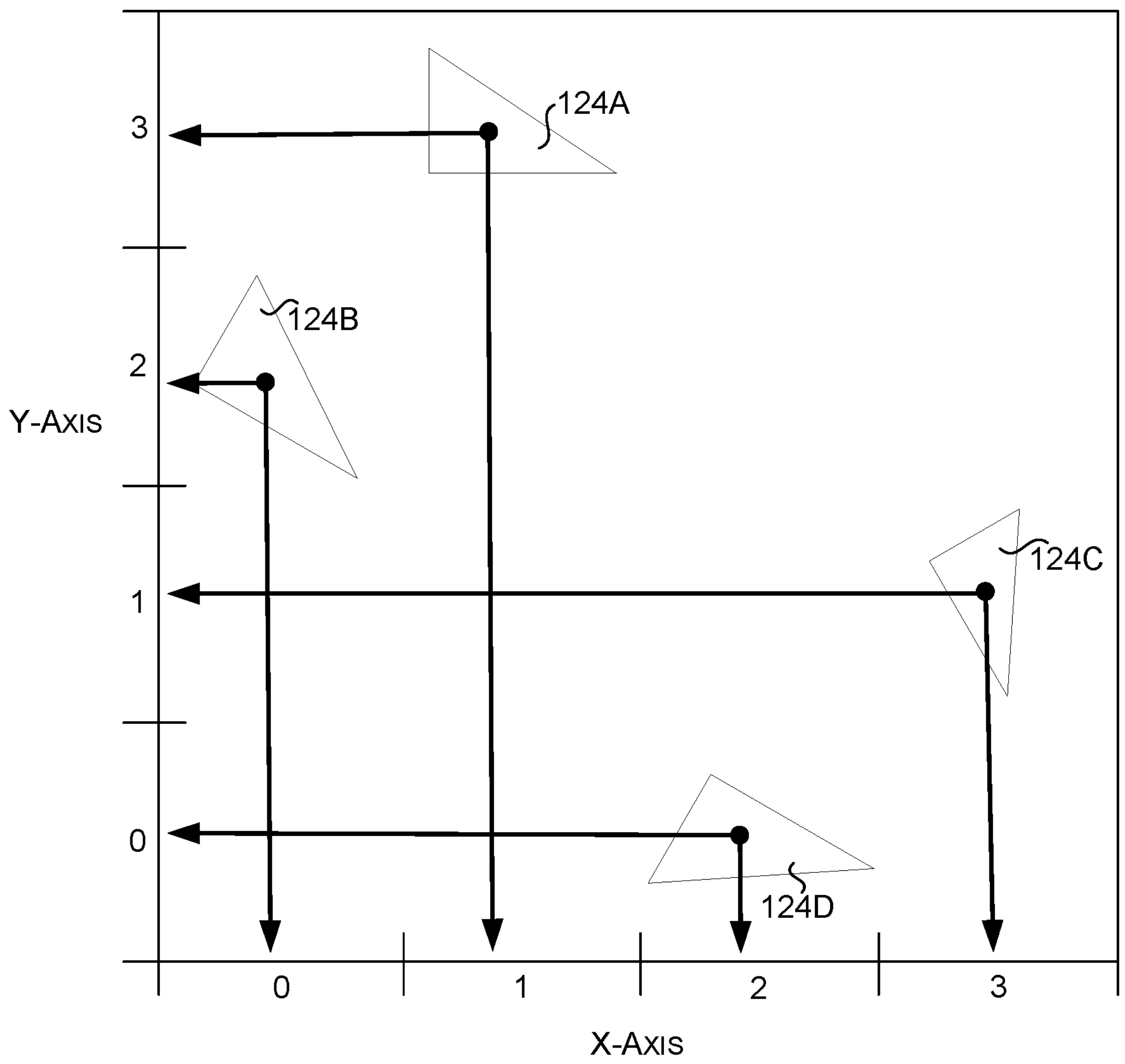
FIG. 3 is an example of a diagram illustrating projection of spatial elements into multi-dimensional bins, in accordance with some embodiments of the present disclosure.

The bin assignor 106 may be configured to assign one or more spatial elements to one or more of the multi-dimensional bins. For example, the bin assignor 106 may be configured to assign one or more of the spatial elements 124 to one or more bins of the multi-dimensional bins 122. In at least one embodiment, the bin assignor 106 is configured to assign a spatial element 124 to a multi-dimensional bin based at least on the bin at least partially including the spatial element. For example, the bin assignor 106 may assign each spatial element 124 to a bin based at least on determining at least one portion of the spatial element 124 falls within the bin. Referring now to FIG. 3, FIG. 3 is an example of a diagram illustrating projection of spatial elements into multi-dimensional bins, in accordance with some embodiments of the present disclosure.

To determine assignments between spatial elements and multi-dimensional bins, the bin assignor 106 may be configured to project spatial elements into the multi-dimensional bins along one or more dimensions. For example, one or more portions (e.g., centroids) of the spatial elements 124 are shown as being projected along an X-axis and along a Y-axis to determine which spatial elements fall within which bins along the dimensions. The bin assignor 106 may then assign the spatial elements 124 to the bins that the one or more portions fall within. For example, the spatial element 124A may be assigned to the bin (1, 3), the spatial element 124B may be assigned to the bin (0, 2), the spatial element 124C may be assigned to the bin (3, 1), and the spatial element 124D may be assigned to the bin (2, 0).

In at least one embodiment, the bin assignor 106 stores one or more values indicating the assignments between the spatial elements and the multi-dimensional bins. For example, for each bin, the bin assignor 106 may store one or more values indicating one or more spatial elements assigned to the bin. In at least one embodiment, the one or more values may indicate a count of spatial elements assigned to the one or more bins. For example, for each bin, the bin assignor 106 may store a count of spatial elements assigned to the bin.

In at least one embodiment, the one or more values may indicate an aggregation of bounding boxes of the spatial elements assigned to the one or more bins. For example, for each bin, the bin assignor 106 may store a bounding box (e.g., an X, Y, and Z coordinates) that corresponds to an aggregation of bounding boxes of spatial elements assigned to the bin.

In at least one embodiment, the one or more values may indicate the bounds of centroids or other portions of the spatial elements assigned to the one or more bins. When partitioning spatial elements using a split plane, the centroid bounds may be used to determine which side of a split plane includes the spatial element(s) from a particular bin.

Generally, the content indicated by the one or more values may vary depending upon various factors, such as the information used by the partition determiner 108 to determine partitions. In at least one embodiment, the one or more values may be stored in local memory and/or shared memory. Local memory may refer to memory that is allocated and managed at a thread or workgroup level within a PPU's execution units (e.g., streaming multiprocessors). Shared memory may refer to memory that is allocated for efficient data sharing and communication between threads within the same workgroup or thread block.

The partition determiner 108 may be configured to determine one or more partitions of the spatial elements based at least on one or more assignments between the one or more spatial elements and the one or more multi-dimensional bins determined using the bin assignor 106. For example, the partition determiner 108 may determine, based at least on the one or more assignments and the multi-dimensional bins 122, one or more of partitions 150A, 150B, 152A, 152B, 154A, or 154B.

In order for the bin assignor 106 to assign a spatial element 124 to one or more bins, location information (e.g., vertex coordinates) for the spatial element 124 may be read from memory, such as global memory (e.g., main or system memory). By assigning one or more spatial elements to one or more multi-dimensional bins, the partition determiner 108 may determine one or more partitions and one or more subpartitions thereof using a single read of spatial elements, thereby reducing the memory bandwidth needed to determine the partitions.

For example, the partition determiner 108 may determine, based at least on the one or more assignments and the multi-dimensional bins 122, a partition, such as the partition 150A. The partition determiner 108 may also determine, based at least on the one or more assignments and a subset of the multi-dimensional bins 122 that correspond to the partition, one or more subpartitions of the partition, such as the partition 152A or the partition 152B with respect to the partition 150A. For example, the partition determiner 108 may use the one or more values indicating the assignments (e.g., counters, aggregated bounding shapes, etc.) to determine one or more partitions and one or more sub-partitions thereof. As such, the partition determiner 108 need not determine new bins or read spatial element location information from memory to assign the spatial elements to those bins each time a partition is to be generated.

Figure 4:
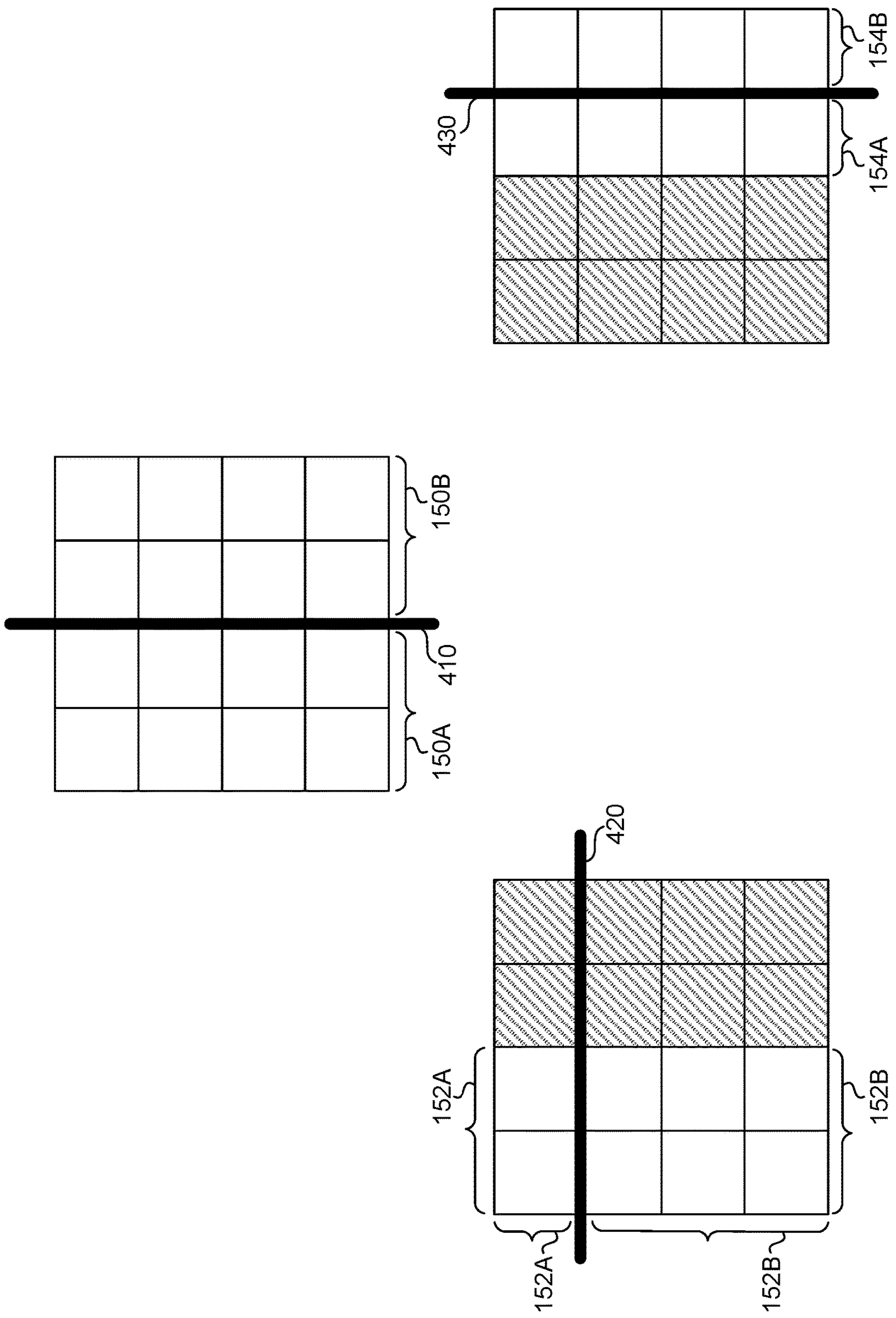
FIG. 4 is an example of a diagram illustrating split planes which may be determined using multi-dimensional bins, in accordance with some embodiments of the present disclosure.

The partition determiner 108 may use various approaches to determine one or more partitions based at least on the one or more assignments and the multi-dimensional bins. In at least one embodiment, one or more partitions are determined based at least on selecting one or more split planes that define the one or more partitions. Referring now to FIG. 4, FIG. 4 is an example of a diagram illustrating split planes which may be determined using multi-dimensional bins, in accordance with some embodiments of the present disclosure. FIG. 4 shows a split plane 410, which the partition determiner 108 may select to define the partition 150A and/or the partition 150B based at least on the one or more assignments and the multi-dimensional bins 122.

Conventionally, once a partition is determined (e.g., a split plane is selected using the bins), new bins and bin-assignments of spatial elements may be determined to determine a subpartition (e.g., a split plane is selected using the new bins). However, FIG. 4 shows a split plane 420, which the partition determiner 108 may select to define the partition 152A and/or the partition 152B based at least on the one or more assignments and a set of the multi-dimensional bins 122 corresponding to the partition 150A. FIG. 4 further shows a split plane 430, which the partition determiner 108 may select to define the partition 154A and/or the partition 154B based at least on the one or more assignments and a set of the multi-dimensional bins 122 corresponding to the partition 150B.

Various approaches may be used to select a split plane used to define a partition. In at least one embodiment, the partition determiner 108 determines one or more split plane candidates and selects one or more of the split plane candidates to define one or more partitions. For example, each set of N bins along a particular dimension may implicitly define N−1 split plane candidates where one of the N bins ends and the next bin starts. The partition determiner 108 may determine one or more such split plane candidates for one or more of the dimensions and evaluate the split plane candidates to select a split plane therefrom.

Various approaches may be used to evaluate split plane candidates. In at least one embodiment, stored bin information is used to compute one or more cost values for each split plane candidate, and the partition determiner 108 may select a split plane candidate based at least on the one or more cost values (e.g., select the lowest cost split plane candidate and/or a split plane candidate having a cost below a threshold value). For example, in at least one embodiment, the partition determiner 108 uses aggregated bin information (e.g., counts and merged bounding boxes) from any bins on each side of a candidate split plane and uses the aggregated information to compute a cost. In at least one embodiment, the cost function corresponds to a surface area of the merged bounding boxes and/or a count of the spatial elements that correspond to the merged bounding boxes. For example, the cost function may be based at least on a Surface Area Heuristic (SAH). In at least one embodiment, the cost for each split plane candidate i may be computed in accordance with Equation (1):

$$\text{cost}[i] = Nl[i] * \text{surfArea}(\text{BL\_i}) + Nr[i] * \text{surfArea}(\text{Br\_i}), \quad (1)$$

where Nl[i] may refer to a sum of all bin counts for bins to the left of the split plane candidate, Nr[i] may refer to a sum of all bin counts for bins to the right of the split plane candidate, BL_i may refer to the merged bounding box of all bins to the left of the split plane candidate, BR_i may refer to the merged bounding box of all bins to the right of the split plane candidate, and surfArea may refer to a function for computing a surface area of a bounding box.

In various embodiments, any number of subpartitions (e.g., one or more) may be generated or determined from a partition using the multi-dimensional bin assignments, and any number of subpartitions may be further partitioned to generate or determine one or more additional partitions (e.g., zero or more). For example, the multi-bin assignments and a set of the multi-dimensional bins that correspond to the partition 152B may similarly be used to determine one or more additional split planes and partitions. However, when a partition is determined, the set of multi-dimensional bins are reduced, which may reduce the subsequent binning resolution.

In at least one embodiment, the partition determiner 108 may determine whether to partition a set of the multi-dimensional bins based at least on evaluating one or more criteria, such as one or more values indicating or representing one or more quantities of bins in the set of multi-dimensional bins along one or more dimensions (e.g., re-bin when the quantity is below a threshold for any given dimension), a quantity of candidate split planes available for partitioning, a quantity of spatial elements within the set of the multi-dimensional bins, a size of the multi-dimensional bins, a node level of the hierarchical partitioning 120, and/or a partition or split level for the multi-dimensional bins. In at least one embodiment, based at least on evaluating the one or more criteria the partition determiner 108 may generate or determine one or more new bins for determining one or more additional partitions (e.g., generate a new set of multi-dimensional bins 122 for a region that is to be partitioned using approaches described herein).

In at least one embodiment, the projecting of the spatial elements and the evaluating of the split plane candidates may be performed warp-wide (e.g., with a thread for each bin and/or split plane) and a warp-wide reduction may be used to select a split plane from the split plane candidates.

In at least one embodiment, the bin determiner 104 determines the multi-dimensional bins using a warp size. For example, where a warp includes 32 threads, the bin determiner 104 may determine a 32-bin structure that represents the multi-dimensional bins 122. In at least one embodiment, lanes that correspond to invalid bins (e.g., indicated using shading in FIG. 4) may be masked out (disabled or ignored) when performing projection, assignment, and split plane evaluation. While a warp is mentioned, a warp may more generally refer to a thread group, which may refer to a collection of threads that work together to solve a task and/or that execute instructions together. Examples of a thread group include a warp and a wavefront.

As described herein, the node manager 102 may be configured to assign at least one of the spatial elements to a node of the hierarchical partitioning, or otherwise update or generate the hierarchical partitioning based at least on the one or more partitions determined using the partition determiner 108. For example, the node manager 102 may use any of the various partitions or combinations thereof to modify, create, and/or delete one or more nodes from the hierarchical partitioning 120.

In at least one embodiment, the node manager 102 assigns one or more spatial elements that correspond to a subpartition of a partition of spatial elements to a child node to a parent node that corresponds to the partition. For example, the hierarchical partitioning 120A may be determined using such an approach with the node 134A corresponding to the partition 152A and the node 134B corresponding to the partition 152B. The node 134A and the node 134B are children to the node 134A, which corresponds to the partition 150A. Similarly, the node 134C corresponds to the partition 154A and the node 134D corresponds to the partition 154B. The node 134C and the node 134D are children to the node 134B, which corresponds to the partition 150A.

Additionally, or in the alternative, in at least one embodiment, the node manager 102 assigns one or more spatial elements that correspond to a subpartition of a partition of spatial elements to a child node to a parent node that corresponds to the spatial elements. For example, the hierarchical partitioning 120B may be determined using such an approach with the node 140A corresponding to the partition 152A, the node 140B corresponding to the partition 152B, the node 140C corresponding to the partition 154A, and the node 140D corresponding to the partition 154B. The node 140A, the node 140B, the node 140C, and the node 140D are children to the node 130A. While the hierarchical partitioning 120A and the hierarchical partitioning 120B correspond to respectively to the approaches, hybrid approaches may be used.

After (C−1) splits have been chosen from a given set of multi-dimensional bins 122, C child subtrees may be defined. In at least one embodiment, the generation of multi-dimensional child bins of the C children is merged into the partitioning (e.g., using merged centroid bounds, as described herein). However, the C child bins may no longer fit into shared memory. Thus, an alternative approach may be used where during the initial construction of the multi-dimensional bins, one or more values may be stored, for each spatial element, indicating the bin coordinates for the bin assigned to the spatial element. For example, X, Y, Z coordinates may be stored where, as a non-limiting example, for 16 bins, 3*4=12 bits may be needed. The C children may then be determined (e.g., using one or more split planes), and the input spatial element IDs may be partitioned using the bin coordinates to assign each spatial element to its corresponding child partition. As such, for each spatial element, one spatial element ID and full spatial element may be read during bin construction, one bin coordinate triple may be written during construction (e.g., 12-bit), one spatial element ID and during partitioning, one triple may be read out and one spatial element ID may be written out, for a total memory footprint that may only moderately be over one full spatial element's worth of memory. The total bandwidth saved using disclosed approaches may be on the order of C/2, assuming an average of C children per multi-dimensional bin.

It may be desirable to ensure that the multi-dimensional bins to fit into shared memory. This may allow each execution unit (e.g., streaming multiprocessor) of a PPU to build its own bin over a subset of the spatial elements, and only at the end merge the bins into a global set of bins in DRAM. However, shared memory may be limited, creating a trade-off between how many bins are created (and thus, how many split planes can be selected), and how much data can be stored per bin. In at least one embodiment, to reduce the size of the data, rather than storing a full float-precision bounding box per bin, a bin may store a distance (e.g., a maximum distance) of a spatial element's bounding box coordinates from a reference position of the bin (e.g., the bin's center position). Using this approach three coordinates may be stored to indicate the bounding box rather than six. Additionally, or in the alternative, the data may be stored using lower precision, such as using 10:10:10 bit encoding, using three half-precision floats, or using three 16-bit fixed-point values relative to the spatial element bounds.

When an execution unit (e.g., streaming multiprocessor) of a PPU builds a set of bins over a set of input spatial elements, the execution unit may frequently use atomic min/max/add to update the bins. In software, the data types for representing each bin may be defied by the atomic operations. By introducing additional atomic primitives, additional data types may be available. For example, an encoded 10:10:10 three-dimensional max atomic operation may use significantly less memory per bin than an implementation using 3 floats or significantly less computationally intensive than an "emulated" 10:10:10 min atomic operation via a repeated Compare-And-Swap (CAS)-and-update atomic operation.

Figure 5:
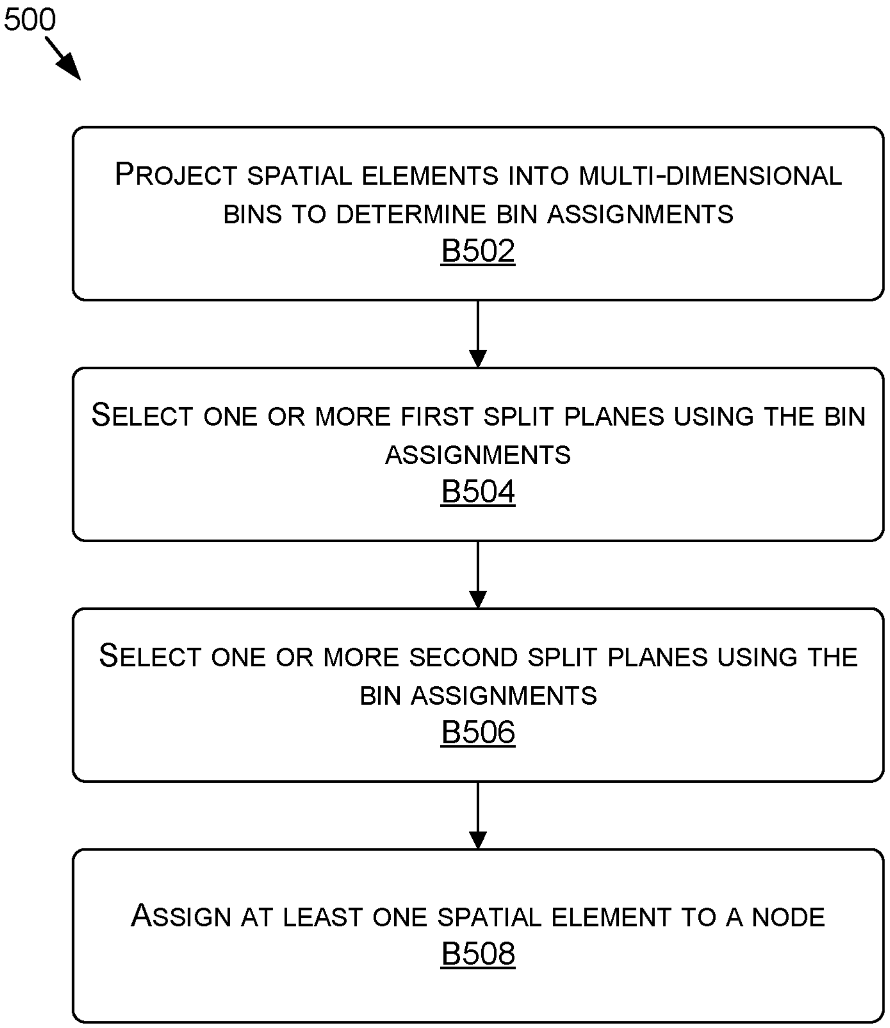
FIG. 5 is a flow diagram showing a method for projecting spatial elements into multi-dimensional bins to select split planes for partitions of spatial elements, in accordance with embodiments of the present disclosure.
Figure 6:
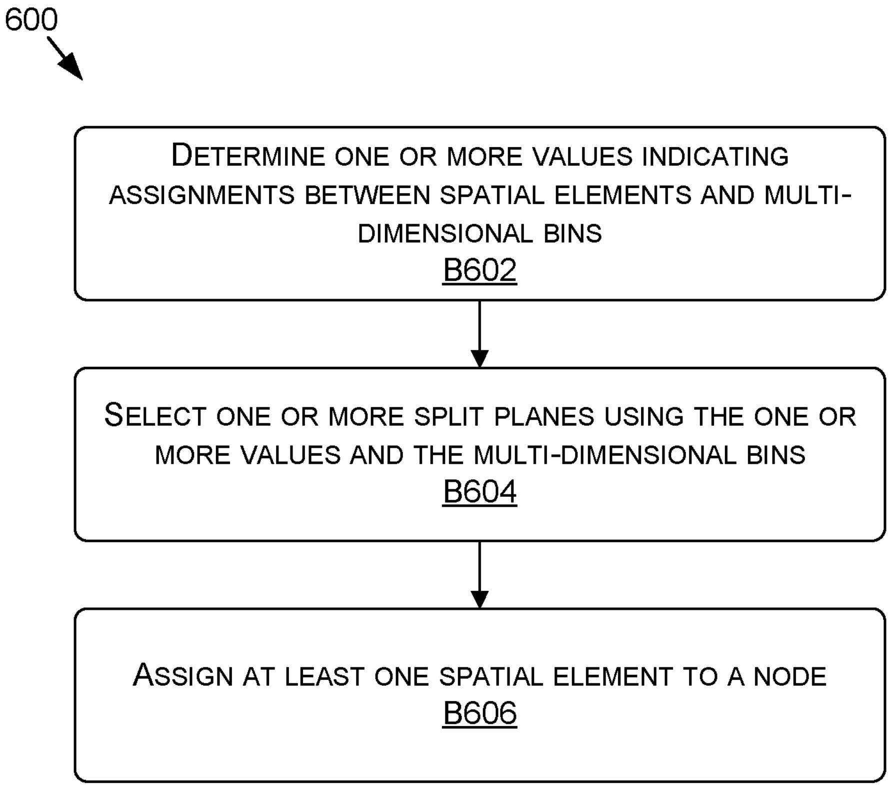
FIG. 6 is a flow diagram showing a method for determining values indicating assignments between spatial elements and multi-dimensional bins to select split planes for partitions of spatial elements, in accordance with embodiments of the present disclosure.

Now referring to FIGS. 5 and 6, each block of method 500, method 600, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the process 100 of FIG. 1. However, these methods may additionally or alternatively be executed by any one system, or any combination of systems, including, but not limited to, those described herein.

FIG. 5 is a flow diagram showing a method 500 for projecting spatial elements into multi-dimensional bins to select split planes for partitions of spatial elements, in accordance with embodiments of the present disclosure. The method 500, at block B502, includes projecting spatial elements into multi-dimensional bins to determine bin assignments (associations). For example, the bin assignor 106 may project the spatial elements 124 of the scene 118 into the multi-dimensional bins 122 that correspond to a spatial partitioning of the scene 118 to determine assignments (associations) between the spatial elements 124 and the multi-dimensional bins 122.

At block B504, the method 500 includes selecting one or more first split planes using the bin assignments (associations). For example, the partition determiner 108 may select, using the assignments (associations) and the multi-dimensional bins 122, the split plane 410 defining the partition 150A of the spatial elements 124.

At block B506, the method 500 includes selecting one or more second split planes using the bin assignments (associations). For example, the partition determiner 108 may select, using the assignments (associations) and a subset of the multi-dimensional bins 122 that is defined by the split plane 410 (e.g., the bins to the left of the split plane 410), the split plane 420 defining the partition 152A.

At block B508, the method 500 includes assigning at least one spatial element to a node. For example, the node manager 102 may assign at least one of the spatial elements 124 to the node 134A of the hierarchical partitioning 120A or the node 140A of the hierarchical partitioning 120B based at least on the partition 152A.

FIG. 6 is a flow diagram showing a method 600 for determining values indicating assignments (associations) between spatial elements and multi-dimensional bins to select split planes for partitions of spatial elements, in accordance with embodiments of the present disclosure. The method 600, at block B602, includes determining one or more values indicating assignments (associations) between spatial elements and multi-dimensional bins. For example, the bin assignor 106 may determine one or more values indicating assignments (associations) between the spatial elements 124 of the scene 118 and the multi-dimensional bins 122 that correspond to a spatial partitioning of the scene 118.

At block B604, the method 600 includes selecting one or more split planes using the one or more values and the multi-dimensional bins. For example, the partition determiner 108 may select, using the one or more values and the multi-dimensional bins 122, the split plane 410 defining the partition 150A of the spatial elements 124.

At block B606, the method 600 includes assigning at least one spatial element to a node. For example, the node manager 102 may assign at least one of the spatial elements 124 to the node 132A of the hierarchical partitioning 120A based at least on the partition 150A.

EXAMPLE IMPLEMENTATIONS

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method that includes projecting spatial elements of a scene into multi-dimensional bins that correspond to a spatial partitioning of the scene to determine associations between the spatial elements and the multi-dimensional bins; selecting, using the associations and the multi-dimensional bins, one or more first split planes defining a partition of the spatial elements and a corresponding subset of the multi-dimensional bins; selecting, using the associations and the subset of the multi-dimensional bins that is defined by the one or more first split planes, one or more second split planes defining a subpartition of the partition of the spatial elements; assigning at least one spatial element of the spatial elements to a node corresponding to a hierarchical partitioning of the spatial elements based at least on the subpartition; and rendering an image of the scene by performing one or more light transport simulation techniques using the hierarchical partitioning. Other embodiments of this aspect include corresponding computer systems, apparatus, and computer programs recorded on one or more computer storage devices, each configured to perform the actions of the methods.

Implementations may include one or more of the following features. The method where the node is a child node of a parent node that corresponds to at least one of the partition or one or more of the spatial elements. The one or more first split planes are along a first dimension of the multi-dimensional bins and the one or more second split planes are along a second dimension of the multi-dimensional bins. The selecting of the one or more first split planes is based at least on a first cost value computed for the partition using the one or more values, and the selecting of the one or more second split planes is based at least on a second cost value computed for the subpartition using the one or more values. The one or more values indicate a count of the spatial elements assigned to the one or more bins and an aggregation of bounding boxes of the spatial elements assigned to the one or more bins. A spatial element of the spatial elements includes at least one of: a primitive, a model, a mesh, a point, a voxel, a particle, a light source, an object, an emitter, or a sensor. The multi-dimensional bins include bins in at least three dimensions. The performing at least one light transport simulation technique of the one or more light transport simulation techniques may include a ray intersection testing with geometry in the scene using the hierarchical partitioning of the spatial elements as an acceleration structure. Implementations of the described techniques may include hardware, a method or process, or computer software on a computer-accessible medium.

One general aspect includes one or more processing units to perform operations including: determining one or more values indicating associations between spatial elements of a scene and multi-dimensional bins that correspond to a spatial partitioning of the scene; selecting, using the one or more values and the multi-dimensional bins, one or more split planes defining a partition of the spatial elements; assigning at least one spatial element of the spatial elements to a node corresponding to a hierarchical partitioning of the spatial elements based at least on the partition; and using the hierarchical partitioning to accelerate an application of at least one light transport simulation technique to render one or more images of the scene. Other embodiments of this aspect include corresponding computer systems, apparatus, and computer programs recorded on one or more computer storage devices, each configured to perform the actions of the methods.

Implementations may include one or more of the following features. The system where the node is a child node of a parent node that corresponds to the spatial elements. The operations further include selecting, using the associations and a subset of the multi-dimensional bins that is defined by the one or more split planes, one or more second split planes defining a subpartition of the partition of the spatial elements, where the assigning is further based at least on the subpartition. The one or more values indicate a multi-dimensional bounding box corresponding to an aggregation of bounding boxes of a plurality of the spatial elements assigned to a bin of the multi-dimensional bins. The multi-dimensional bins include at least an x-dimension, a y-dimension, and a z-dimension. The at least one light transport simulation technique may include a ray intersection testing with geometry in the scene using the hierarchical partitioning of the spatial elements as an acceleration structure. The system is may include in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3d assets; a system for performing deep learning operations; a system implementing one or more large language models (LLMs); a system implemented using an edge device; a system implemented using a machine; a system for performing conversational ai operations; a system for generating synthetic data; a system incorporating one or more virtual machines (VMs); a system implemented at least partially in a data center; or a system implemented at least partially using cloud computing resources. Implementations of the described techniques may include hardware, a method or process, or computer software on a computer-accessible medium.

One general aspect includes at least one processor including one or more circuits to assign at least one spatial element of spatial elements of a scene to a node corresponding to a hierarchical partitioning of the spatial elements based at least on a subpartition of a partition of the spatial elements, the subpartition being determined based at least on: projecting the spatial elements into multi-dimensional bins that correspond to a spatial partitioning of the scene to determine associations between the spatial elements and the multi-dimensional bins; determining, using the assignments and the multi-dimensional bins, the partition of the spatial elements; and determining the subpartition using the assignments and a subset of the multi-dimensional bins that corresponds to the partition. Other embodiments of this aspect include corresponding computer systems, apparatus, and computer programs recorded on one or more computer storage devices, each configured to perform the actions of the methods.

Implementations may include one or more of the following features. The at least one processor where the determining of the partition is based at least on selecting, using the assignments and the multi-dimensional bins, one or more first split planes defining the partition, and the determining of the subpartition is based at least on selecting, using the assignments and the subset of the multi-dimensional bins, one or more second split planes defining the subpartition. The node is a child node of a parent node that corresponds to at least one of the partition or one or more of the spatial elements. The one or more circuits may be to based at least on a quantity of bins in a second subset of the multi-dimensional bins that corresponds to the subpartition: project a subset of the spatial elements that correspond to subpartition into second multi-dimensional bins that correspond to a second spatial partitioning of the scene to determine second assignments between the subset of the spatial elements and the second multi-dimensional bins; determine, using the second assignments and the second multi-dimensional bins, a partition of the subset of the spatial elements; and assign one or more of the spatial elements to a second node corresponding to the hierarchical partitioning based at least on the partition of the subset of the spatial elements. The at least one processor may be comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3d assets; a system for performing deep learning operations; a system implementing one or more large language models (LLMs); a system implemented using an edge device; a system implemented using a machine; a system for performing conversational ai operations; a system for generating synthetic data; a system incorporating one or more virtual machines (VMs); a system implemented at least partially in a data center; or a system implemented at least partially using cloud computing resources. Implementations of the described techniques may include hardware, a method or process, or computer software on a computer-accessible medium.

Example Parallel Processing Architecture

Figure 7:
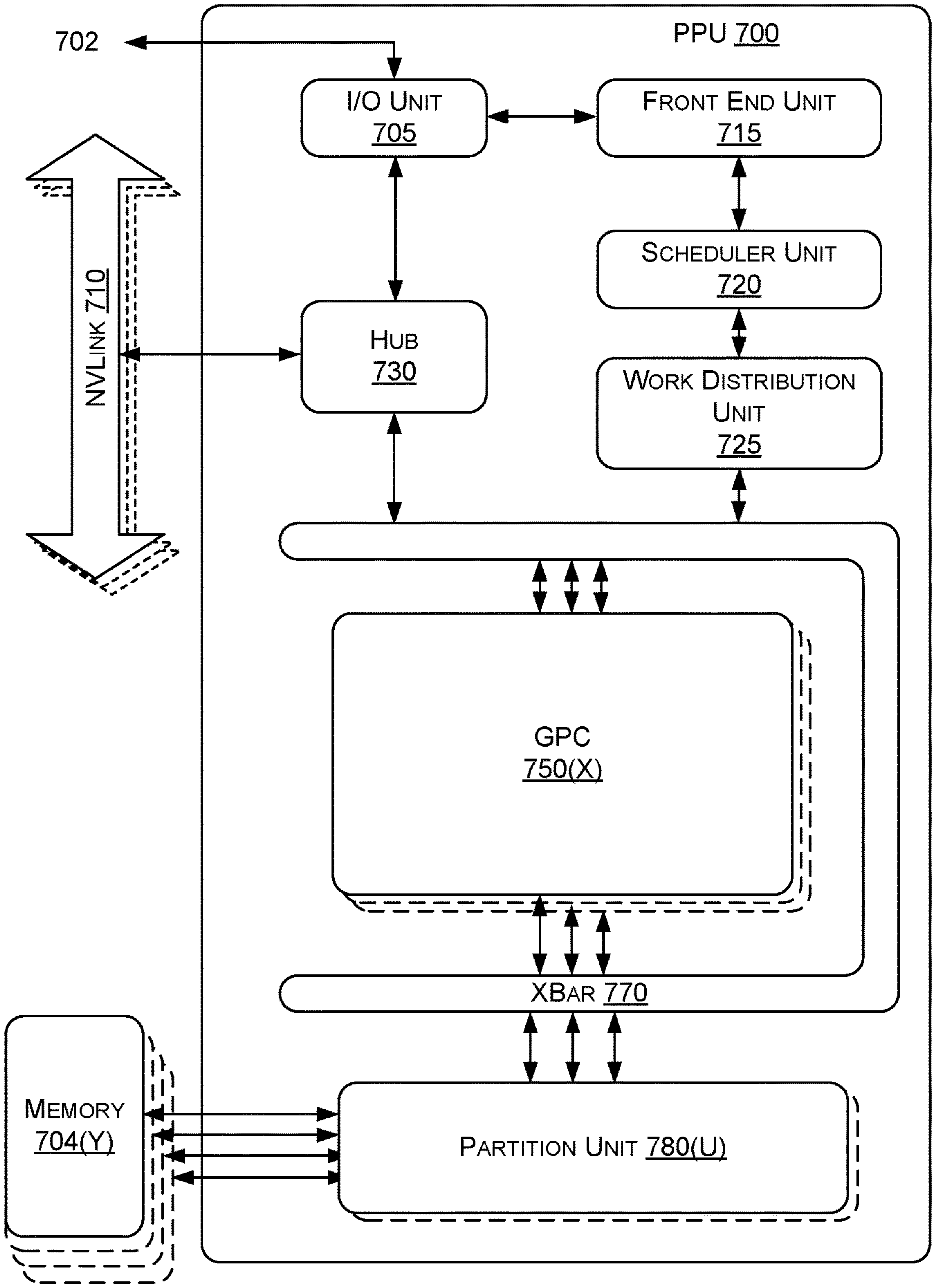
FIG. 7 illustrates an example parallel processing unit suitable for use in implementing at least some embodiments of the present disclosure.

FIG. 7 illustrates an example parallel processing unit (PPU) 700 suitable for use in implementing at least some embodiments of the present disclosure. In at least one embodiment, the PPU 700 is a multi-threaded processor that is implemented on one or more integrated circuit devices. The PPU 700 may have a latency hiding architecture designed to process many threads in parallel. A thread (e.g., a thread of execution) may refer to an instantiation of a set of instructions configured to be executed by the PPU 700. In at least one embodiment, the PPU 700 is a graphics processing unit (GPU) configured to implement a graphics rendering pipeline for processing three-dimensional (3D) graphics data in order to generate two-dimensional (2D) image data for display on a display device such as a liquid crystal display (LCD) device. In one or more embodiments, the PPU 700 may be used for performing general-purpose computations. While one parallel processor is provided herein for illustrative purposes, it should be noted that such processor is set forth for illustrative purposes only, and that any processor may be employed to supplement and/or substitute for the same.

One or more PPUs 700 may be configured to accelerate, by way of example and not limitation, thousands of High-Performance Computing (HPC), data center, and machine learning applications. The PPU 700 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, light transport simulation, astronomy, molecular dynamics simulation, financial modeling, robotics, digital twinning, synthetic data generation, factory automation, real-time language translation, online search optimizations, personalized user recommendations, and the like.

As shown in FIG. 7, the PPU 700 includes an Input/Output (I/O) unit 705, a front end unit 715, a scheduler unit 720, a work distribution unit 725, a hub 730, a crossbar (Xbar) 770, one or more general processing clusters (GPCs) 750, and one or more partition units 780. The PPU 700 may be connected to a host processor or other PPUs 700 via one or more high-speed NVLink 710 interconnect. The PPU 700 may be connected to a host processor or other peripheral devices via an interconnect 702. The PPU 700 may also be connected to a local memory comprising a number of memory devices 704. In at least one embodiment, the local memory may comprise a number of dynamic random-access memory (DRAM) devices. The DRAM devices may be configured as a high-bandwidth memory (HBM) subsystem, with multiple DRAM dies stacked within each device.

The NVLink 710 interconnect enables systems to scale and include one or more PPUs 700 combined with one or more CPUs, supports cache coherence between the PPUs 700 and CPUs, and CPU mastering. Data and/or commands may be transmitted by the NVLink 710 through the hub 730 to/from other units of the PPU 700 such as one or more copy engines, a video encoder, a video decoder, a power management unit, etc. (not explicitly shown).

The I/O unit 705 may be configured to transmit and receive communications (e.g., commands, data, etc.) from a host processor (not shown) over the interconnect 702. The I/O unit 705 may communicate with the host processor directly via the interconnect 702 or through one or more intermediate devices such as a memory bridge. In at least one embodiment, the I/O unit 705 may communicate with one or more other processors, such as one or more the PPUs 700 via the interconnect 702. In at least one embodiment, the I/O unit 705 implements a Peripheral Component Interconnect Express (PCIe) interface for communications over a PCIe bus and the interconnect 702 is a PCIe bus. In at least one embodiment, the I/O unit 705 may implement other types of well-known interfaces for communicating with external devices.

The I/O unit 705 decodes packets received via the interconnect 702. In at least one embodiment, the packets represent commands configured to cause the PPU 700 to perform various operations. The I/O unit 705 transmits the decoded commands to various other units of the PPU 700 as the commands may specify. For example, some commands may be transmitted to the front end unit 715. Other commands may be transmitted to the hub 730 or other units of the PPU 700 such as one or more copy engines, a video encoder, a video decoder, a power management unit, etc. (not explicitly shown). In other words, the I/O unit 705 may be configured to route communications between and among the various logical units of the PPU 700.

In at least one embodiment, a program executed by the host processor encodes a command stream in a buffer that provides workloads to the PPU 700 for processing. A workload may comprise several instructions and data to be processed by those instructions. The buffer may be a region in a memory that is accessible (e.g., read/write) by both the host processor and the PPU 700. For example, the I/O unit 705 may be configured to access the buffer in a system memory connected to the interconnect 702 via memory requests transmitted over the interconnect 702. In at least one embodiment, the host processor writes the command stream to the buffer and then transmits a pointer to the start of the command stream to the PPU 700. The front end unit 715 receives pointers to one or more command streams. The front end unit 715 manages the one or more streams, reading commands from the streams and forwarding commands to the various units of the PPU 700.

The front end unit 715 is coupled to a scheduler unit 720 that configures the various GPCs 750 to process tasks defined by the one or more streams. The scheduler unit 720 is configured to track state information related to the various tasks managed by the scheduler unit 720. The state may indicate which GPC 750 a task is assigned to, whether the task is active or inactive, a priority level associated with the task, and so forth. The scheduler unit 720 manages the execution of a plurality of tasks on the one or more GPCs 750.

The scheduler unit 720 is coupled to a work distribution unit 725 that is configured to dispatch tasks for execution on the GPCs 750. The work distribution unit 725 may track a number of scheduled tasks received from the scheduler unit 720. In at least one embodiment, the work distribution unit 725 manages a pending task pool and an active task pool for each of the GPCs 750. The pending task pool may comprise a number of slots (e.g., 32 slots) that contain tasks assigned to be processed by a particular GPC 750. The active task pool may comprise a number of slots (e.g., 4 slots) for tasks that are actively being processed by the GPCs 750. As a GPC 750 finishes the execution of a task, that task may be evicted from the active task pool for the GPC 750 and one of the other tasks from the pending task pool is selected and scheduled for execution on the GPC 750. If an active task has been idle on the GPC 750, such as while waiting for a data dependency to be resolved, then the active task may be evicted from the GPC 750 and returned to the pending task pool while another task in the pending task pool is selected and scheduled for execution on the GPC 750.

The work distribution unit 725 communicates with the one or more GPCs 750 via XBar 770. The Xbar 770 is an interconnect network that couples many of the units of the PPU 700 to other units of the PPU 700. For example, the Xbar 770 may be configured to couple the work distribution unit 725 to a particular GPC 750. Although not shown explicitly, one or more other units of the PPU 700 may also be connected to the Xbar 770 via the hub 730.

The tasks are managed by the scheduler unit 720 and dispatched to a GPC 750 by the work distribution unit 725. The GPC 750 is configured to process the task and generate results. The results may be consumed by other tasks within the GPC 750, routed to a different GPC 750 via the Xbar 770, or stored in the memory 704. The results can be written to the memory 704 via the partition units 780, which may implement a memory interface for reading and writing data to/from the memory 704. The results can be transmitted to another PPU 700 or CPU via the NVLink 710. In at least one embodiment, the PPU 700 includes a number U of partition units 780 that is equal to the number of separate and distinct memory devices 704 coupled to the PPU 700.

In at least one embodiment, a host processor executes a driver kernel that implements an application programming interface (API) that enables one or more applications executing on the host processor to schedule operations for execution on the PPU 700. In at least one embodiment, multiple compute applications are simultaneously executed by the PPU 700 and the PPU 700 provides isolation, quality of service (QOS), and independent address spaces for the multiple compute applications. An application may generate instructions (e.g., API calls) that cause the driver kernel to generate one or more tasks for execution by the PPU 700. The driver kernel may output tasks to one or more streams being processed by the PPU 700. Each task may comprise one or more groups of related threads, wherein may be referred to as a warp. In at least one embodiment, a warp comprises 32 related threads that may be executed in parallel. Cooperating threads may refer to a plurality of threads including instructions to perform the task and that may exchange data through shared memory.

Figure 8A:
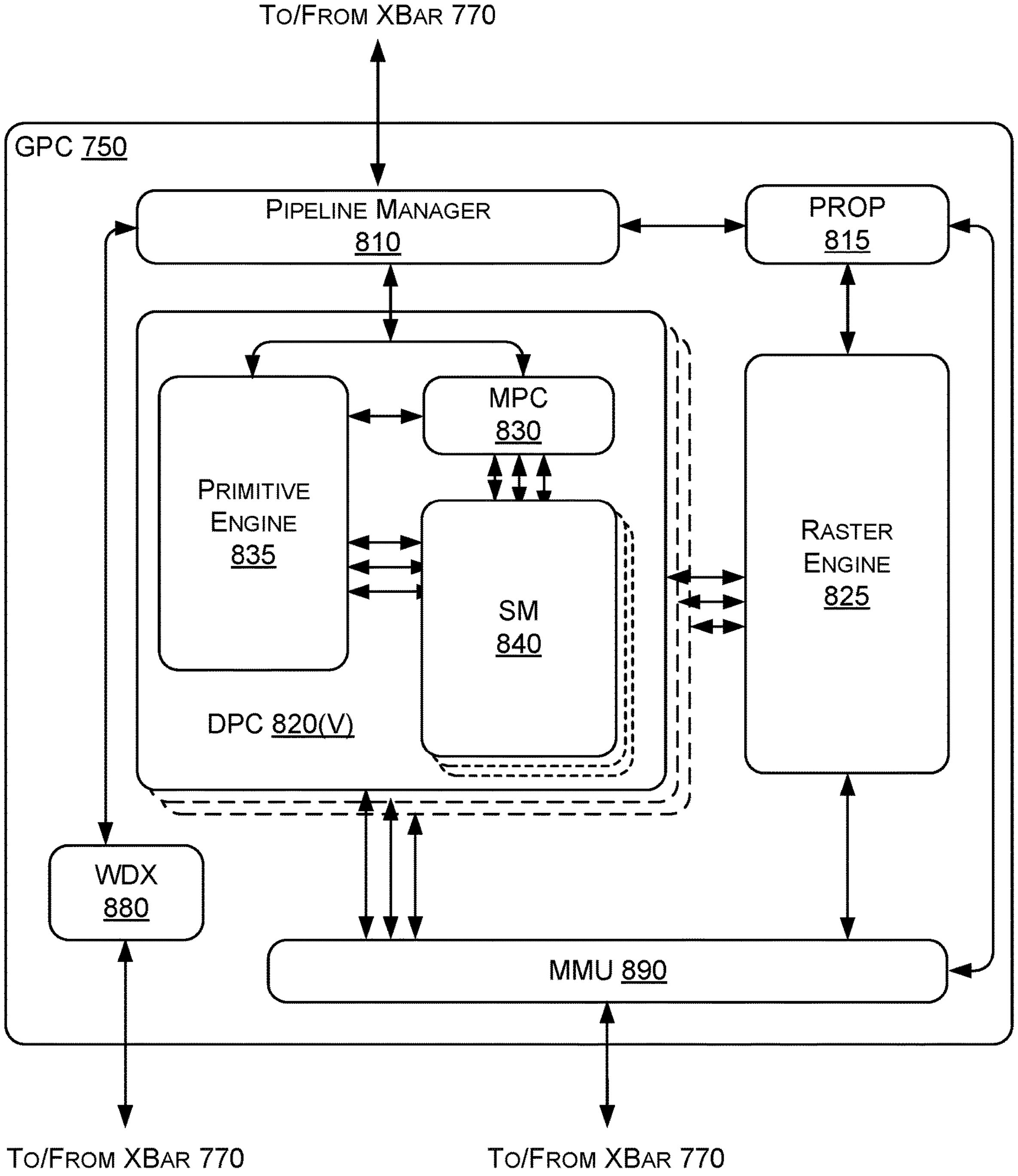
FIG. 8A illustrates an example general processing cluster within the parallel processing unit of FIG. 7 suitable for use in implementing at least some embodiments of the present disclosure.

FIG. 8A illustrates an example GPC 750 of the PPU 700 of FIG. 7 suitable for use in implementing at least some embodiments of the present disclosure. As shown in FIG. 8A, each GPC 750 may include a number of hardware units for processing tasks. In at least one embodiment, each GPC 750 includes a pipeline manager 810, a pre-raster operations unit (PROP) 815, a raster engine 825, a work distribution crossbar (WDX) 880, a memory management unit (MMU) 890, and one or more Data Processing Clusters (DPCs) 820.

It will be appreciated that the GPC 750 of FIG. 8A may include other hardware units in lieu of or in addition to the units shown in FIG. 8A.

In at least one embodiment, the operation of the GPC 750 is controlled by the pipeline manager 810. The pipeline manager 810 manages the configuration of the one or more DPCs 820 for processing tasks allocated to the GPC 750. In at least one embodiment, the pipeline manager 810 may configure at least one of the one or more DPCs 820 to implement at least a portion of a graphics rendering pipeline. For example, a DPC 820 may be configured to execute a vertex shader program on the programmable streaming multiprocessor (SM) 840. The pipeline manager 810 may also be configured to route packets received from the work distribution unit 725 to the appropriate logical units within the GPC 750. For example, some packets may be routed to fixed function hardware units in the PROP 815 and/or raster engine 825 while other packets may be routed to the DPCs 820 for processing by the primitive engine 835 or the SM 840. In at least one embodiment, the pipeline manager 810 may configure at least one of the one or more DPCs 820 to implement a neural network model and/or a computing pipeline.

The PROP unit 815 may be configured to route data generated by the raster engine 825 and the DPCs 820 to a Raster Operations (ROP) unit. The PROP unit 815 may also be configured to perform optimizations for color blending, organizing pixel data, performing address translations, and the like.

The raster engine 825 may include a number of fixed function hardware units configured to perform various raster operations. In at least one embodiment, the raster engine 825 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 825 comprises fragments to be processed, for example, by a fragment shader implemented within a DPC 820.

Each DPC 820 included in the GPC 750 includes an M-Pipe Controller (MPC) 830, a primitive engine 835, and one or more SMs 840. The MPC 830 controls the operation of the DPC 820, routing packets received from the pipeline manager 810 to the appropriate units in the DPC 820. For example, packets associated with a vertex may be routed to the primitive engine 835, which is configured to fetch vertex attributes associated with the vertex from the memory 704. In contrast, packets associated with a shader program may be transmitted to the SM 840.

The SM 840 comprises a programmable streaming processor that is configured to process tasks represented by a number of threads. Each SM 840 is multi-threaded and configured to execute a plurality of threads (e.g., 32 threads) from a particular group of threads concurrently. In at least one embodiment, the SM 840 implements a SIMD (Single-Instruction, Multiple-Data) architecture where each thread in a group of threads (e.g., a warp) is configured to process a different set of data based on the same set of instructions. All threads in the group of threads execute the same instructions. In at least one embodiment, the SM 840 implements a SIMT (Single-Instruction, Multiple Thread) architecture where each thread in a group of threads is configured to process a different set of data based on the same set of instructions, but where individual threads in the group of threads are allowed to diverge during execution. In at least one embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

The MMU 890 may provide an interface between the GPC 750 and the partition unit 780. The MMU 890 may provide translation of virtual addresses into physical addresses, memory protection, and arbitration of memory requests. In at least one embodiment, the MMU 890 provides one or more translation lookaside buffers (TLBs) for performing translation of virtual addresses into physical addresses in the memory 704.

Figure 8B:
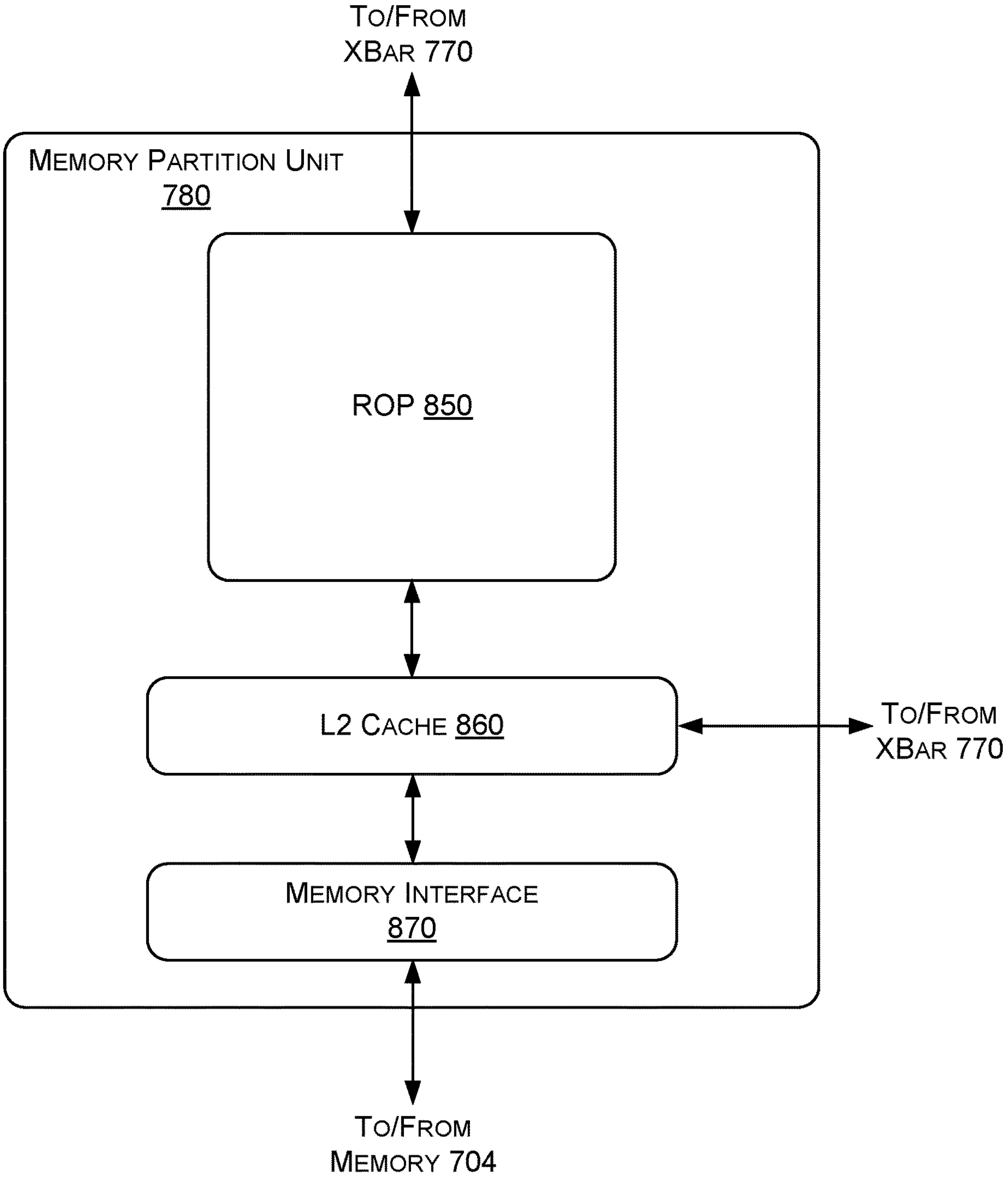
FIG. 8B illustrates an example memory partition unit of the parallel processing unit of FIG. 7 suitable for use in implementing at least some embodiments of the present disclosure.

FIG. 8B illustrates an example memory partition unit 780 of the PPU 700 of FIG. 7 suitable for use in implementing at least some embodiments of the present disclosure. As shown in FIG. 8B, the memory partition unit 780 includes a Raster Operations (ROP) unit 850, a level two (L2) cache 860, and a memory interface 870. The memory interface 870 may be coupled to the memory 704. Memory interface 870 may implement 32, 64, 128, 1024-bit data buses, or the like, for high-speed data transfer. In at least one embodiment, the PPU 700 incorporates U memory interfaces 870, one memory interface 870 per pair of partition units 780, where each pair of partition units 780 is connected to a corresponding memory device 704. For example, the PPU 700 may be connected to up to Y memory devices 704, such as high bandwidth memory stacks or graphics double-data-rate, version 5, synchronous dynamic random access memory, or other types of persistent storage.

In at least one embodiment, the memory interface 870 implements an HBM2 memory interface and Y equals half U. In at least one embodiment, the HBM2 memory stacks are located on the same physical package as the PPU 700, providing substantial power and area savings compared with conventional GDDR5 SDRAM systems. In at least one embodiment, each HBM2 stack includes four memory dies and Y equals 4, with HBM2 stack including two 128-bit channels per die for a total of 8 channels and a data bus width of 1024 bits.

In at least one embodiment, the memory 704 supports Single-Error Correcting Double-Error Detecting (SECDED) Error Correction Code (ECC) to protect data. ECC provides high reliability for compute applications that are sensitive to data corruption. Reliability is especially important in large-scale cluster computing environments where the PPUs 700 process very large datasets and/or run applications for extended periods.

In at least one embodiment, the PPU 700 implements a multi-level memory hierarchy. In at least one embodiment, the memory partition unit 780 supports a unified memory to provide a single unified virtual address space for CPU and PPU 700 memory, enabling data sharing between virtual memory systems. In at least one embodiment the frequency of accesses by a PPU 700 to memory located on other processors is traced to ensure that memory pages are moved to the physical memory of the PPU 700 that is accessing the pages more frequently. In at least one embodiment, the NVLink 710 supports address translation services allowing the PPU 700 to directly access a CPU's page tables and providing full access to CPU memory by the PPU 700.

In at least one embodiment, copy engines transfer data between multiple PPUs 700 or between PPUs 700 and CPUs. The copy engines can generate page faults for addresses that are not mapped into the page tables. The memory partition unit 780 can then service the page faults, mapping the addresses into the page table, after which the copy engine can perform the transfer. With hardware page faulting, addresses can be passed to the copy engines without worrying if the memory pages are resident, and the copy process is transparent.

Data from the memory 704 or other system memory may be fetched by the memory partition unit 780 and stored in the L2 cache 860, which is located on-chip and is shared between the various GPCs 750. As shown, each memory partition unit 780 includes a portion of the L2 cache 860 associated with a corresponding memory device 704. Lower level caches may then be implemented in various units within the GPCs 750. For example, each of the SMs 840 may implement a level one (L1) cache. The L1 cache is private memory that may be dedicated to a particular SM 840. Data from the L2 cache 860 may be fetched and stored in each of the L1 caches for processing in the functional units of the SMs 840. The L2 cache 860 is coupled to the memory interface 870 and the Xbar 770.

The ROP unit 850 performs graphics raster operations related to pixel color, such as color compression, pixel blending, and the like. The ROP unit 850 also implements depth testing in conjunction with the raster engine 825, receiving a depth for a sample location associated with a pixel fragment from the culling engine of the raster engine 825. The depth is tested against a corresponding depth in a depth buffer for a sample location associated with the fragment. If the fragment passes the depth test for the sample location, then the ROP unit 850 updates the depth buffer and transmits a result of the depth test to the raster engine 825. It will be appreciated that the number of partition units 780 may be different than the number of GPCs 750 and, therefore, each ROP unit 850 may be coupled to each of the GPCs 750. The ROP unit 850 may track packets received from the different GPCs 750 and determine which GPC 750 that a result generated by the ROP unit 850 is routed to through the Xbar 770. Although the ROP unit 850 is included within the memory partition unit 780 in FIG. 8B, in other examples, the ROP unit 850 may be outside of the memory partition unit 780. For example, the ROP unit 850 may reside in the GPC 750 or another unit.

Figure 9A:
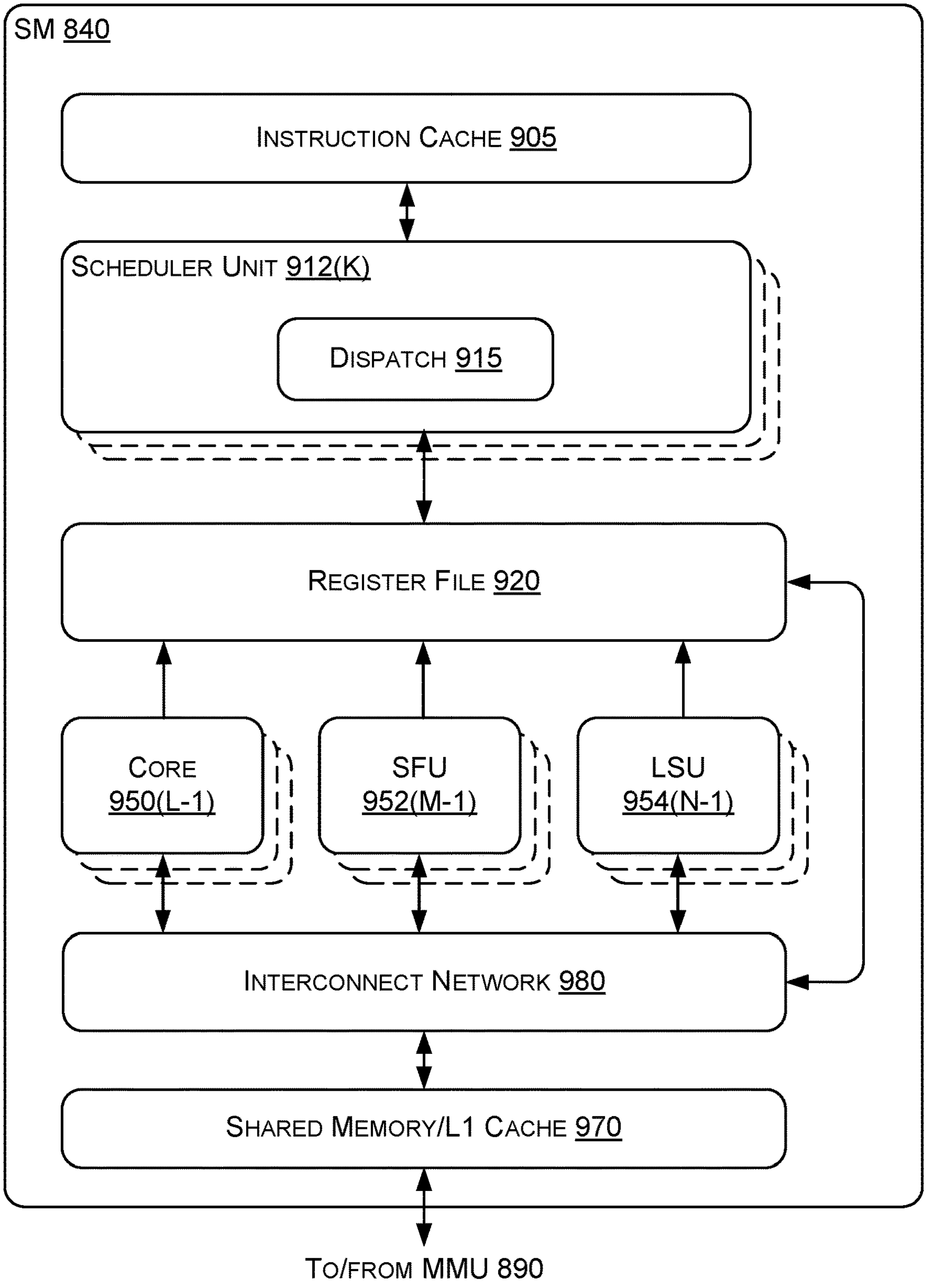
FIG. 9A illustrates an example of the streaming multi-processor of FIG. 8A suitable for use in implementing at least some embodiments of the present disclosure.

FIG. 9A illustrates an example of the streaming multiprocessor 840 of FIG. 8A suitable for use in implementing at least some embodiments of the present disclosure. As shown in FIG. 9A, the SM 840 includes an instruction cache 905, one or more scheduler units 912, a register file 920, one or more processing cores 950, one or more special function units (SFUs) 952, one or more load/store units (LSUs) 954, an interconnect network 980, and a shared memory/L1 cache 970.

As described herein, the work distribution unit 725 dispatches tasks for execution on the GPCs 750 of the PPU 700. The tasks may be allocated to a particular DPC 820 within a GPC 750 and, if the task is associated with a shader program, the task may be allocated to an SM 840. The scheduler unit 912 may receive the tasks from the work distribution unit 725 and manage instruction scheduling for one or more thread blocks assigned to the SM 840. The scheduler unit 912 may schedule thread blocks for execution as warps of parallel threads, where each thread block is allocated at least one warp. In at least one embodiment, each warp executes 32 threads. The scheduler unit 912 may manage a plurality of different thread blocks, allocating the warps to the different thread blocks and then dispatching instructions from the plurality of different cooperative groups to the various functional units (e.g., cores 950, SFUs 952, and LSUs 954) during each clock cycle.

Cooperative Groups may refer to a programming model for organizing groups of communicating threads that allows developers to express the granularity at which threads are communicating, enabling the expression of richer, more efficient parallel decompositions. Cooperative launch APIs may support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 915 may be configured to transmit instructions to one or more of the functional units. In at least one embodiment, the scheduler unit 912 includes two dispatch units 915 that enable two different instructions from the same warp to be dispatched during each clock cycle. In at least embodiment, each scheduler unit 912 may include a single dispatch unit 915 or additional dispatch units 915.

Each SM 840 may include a register file 920 that provides a set of registers for the functional units of the SM 840. In at least one embodiment, the register file 920 is divided between each of the functional units such that each functional unit is allocated a dedicated portion of the register file 920. In at least one embodiment, the register file 920 is divided between the different warps being executed by the SM 840. The register file 920 provides temporary storage for operands connected to the data paths of the functional units.

Each SM 840 may include Z processing cores 950. In at least one embodiment, the SM 840 includes a large number (e.g., 128, etc.) of distinct processing cores 950. Each core 950 may include a fully-pipelined, single-precision, double-precision, and/or mixed precision processing unit that includes a floating point arithmetic logic unit and an integer arithmetic logic unit. In at least one embodiment, the floating point arithmetic logic units implement the IEEE 754-2008 standard for floating point arithmetic. In at least one embodiment, the cores 950 include 64 single-precision (32-bit) floating point cores, 64 integer cores, 32 double-precision (64-bit) floating point cores, and 8 tensor cores.

Tensor cores configured to perform matrix operations, and, in at least one embodiment, one or more tensor cores are included in the cores 950. In particular, the tensor cores may be configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

Training complex neural networks requires massive amounts of parallel computing performance, including floating-point multiplications and additions that are supported by the PPU 700. Inferencing is less compute-intensive than training, being a latency-sensitive process where a trained neural network is applied to new inputs it has not seen before to classify images, translate speech, and infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 700 may form a computing platform capable of delivering performance required for deep neural network-based artificial intelligence and machine learning applications.

In at least one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores may be used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 840 may also include M SFUs 952 that perform special functions (e.g., attribute evaluation, reciprocal square root, and the like). In at least one embodiment, the SFUs 952 may include a tree traversal unit configured to traverse a hierarchical tree data structure. In at least one embodiment, the SFUs 952 may include texture unit configured to perform texture map filtering operations. In at least one embodiment, the texture units are configured to load texture maps (e.g., a 2D array of texels) from the memory 704 and sample the texture maps to produce sampled texture values for use in shader programs executed by the SM 840. In at least one embodiment, the texture maps are stored in the shared memory/L1 cache 870. The texture units implement texture operations such as filtering operations using mip-maps (e.g., texture maps of varying levels of detail). In at least one embodiment, each SM 840 includes two texture units.

Each SM 840 may also include N LSUs 954 that implement load and store operations between the shared memory/L1 cache 970 and the register file 920. Each SM 840 may include an interconnect network 980 that connects each of the functional units to the register file 920 and the LSU 954 to the register file 920, shared memory/L1 cache 970. In at least one embodiment, the interconnect network 980 is a crossbar that can be configured to connect any of the functional units to any of the registers in the register file 920 and connect the LSUs 954 to the register file and memory locations in shared memory/L1 cache 970.

The shared memory/L1 cache 970 may include an array of on-chip memory that allows for data storage and communication between the SM 840 and the primitive engine 835 and between threads in the SM 840. In at least one embodiment, the shared memory/L1 cache 970 comprises 128 KB of storage capacity and is in the path from the SM 840 to the partition unit 780. The shared memory/L1 cache 970 can be used to cache reads and writes. One or more of the shared memory/L1 cache 970, L2 cache 860, and memory 704 may be backing stores.

Combining data cache and shared memory functionality into a single memory block may provide the best overall performance for both types of memory accesses. The capacity may be usable as a cache by programs that do not use shared memory. For example, if shared memory is configured to use half of the capacity, texture and load/store operations can use the remaining capacity. Integration within the shared memory/L1 cache 970 may enable the shared memory/L1 cache 970 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 7, may be bypassed, creating a much simpler programming model. In the general-purpose parallel computation configuration, the work distribution unit 725 may assign and distribute blocks of threads directly to the DPCs 820. The threads in a block may execute the same program, using a unique thread ID in the calculation to ensure each thread generates unique results, using the SM 840 to execute the program and perform calculations, shared memory/L1 cache 970 to communicate between threads, and the LSU 954 to read and write global memory through the shared memory/L1 cache 970 and the memory partition unit 780. When configured for general purpose parallel computation, the SM 840 can also write commands that the scheduler unit 720 can use to launch new work on the DPCs 820.

The PPU 700 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In at least one embodiment, the PPU 700 is embodied on a single semiconductor substrate. In at least one embodiment, the PPU 700 is included in a system-on-a-chip (SoC) along with one or more other devices such as additional PPUs 700, the memory, a reduced instruction set computer (RISC) CPU, a memory management unit (MMU), a digital-to-analog converter (DAC), and the like.

In at least one embodiment, the PPU 700 may be included on a graphics card that includes one or more memory devices 704. The graphics card may be configured to interface with a PCIe slot on a motherboard of a desktop computer. In at least one embodiment, the PPU 700 may be an integrated graphics processing unit (iGPU) or parallel processor included in the chipset of the motherboard.

Example of a Computing System

Systems with multiple GPUs and CPUs are used in a variety of industries as developers expose and use more parallelism in applications such as artificial intelligence computing. High-performance GPU-accelerated systems with tens to many thousands or more of compute nodes are deployed in data centers, research facilities, and supercomputers to solve ever larger problems. As the number of processing devices within the high-performance systems increases, the communication and data transfer mechanisms need to scale to support the increased bandwidth.

Figure 9B:
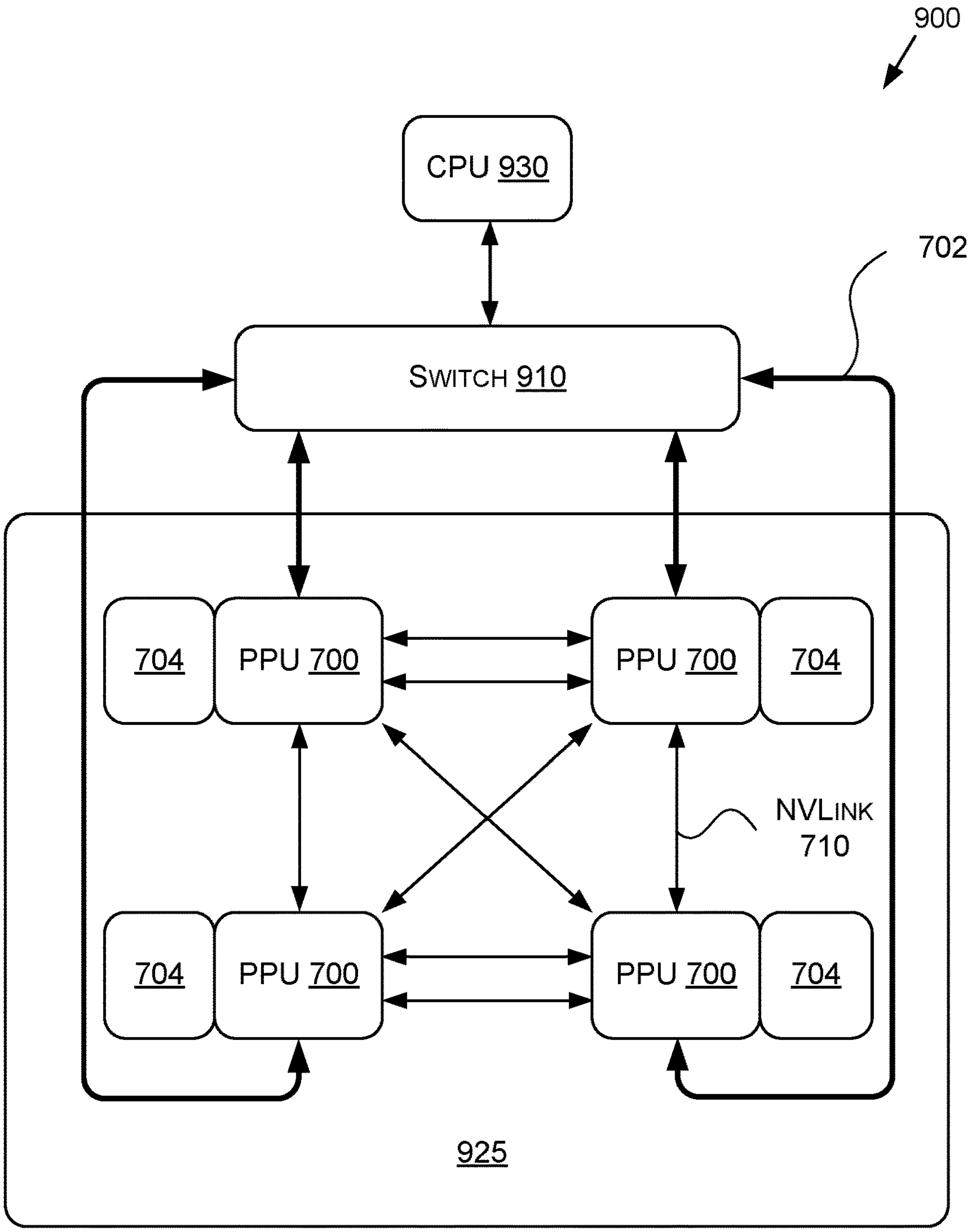
FIG. 9B is an example conceptual diagram of a processing system implemented using the PPU of FIG. 7 suitable for use in implementing at least some embodiments of the present disclosure.

FIG. 9B is an example conceptual diagram of a processing system 900 implemented using the PPU 700 of FIG. 7 suitable for use in implementing at least some embodiments of the present disclosure. The processing system 900 includes a CPU 930, switch 910, and multiple PPUs 700 each and respective memories 704. The NVLink 710 provides high-speed communication links between each of the PPUs 700. Although a particular number of NVLink 710 and interconnect 702 connections are illustrated in FIG. 9B, the number of connections to each PPU 700 and the CPU 930 may vary. The switch 910 interfaces between the interconnect 702 and the CPU 930. The PPUs 700, memories 704, and NVLinks 710 may be situated on a single semiconductor platform to form a parallel processing system 925. In at least one embodiment, the switch 910 supports two or more protocols to interface between various different connections and/or links.

In at least embodiment (not shown), the NVLink 710 provides one or more high-speed communication links between each of the PPUs 700 and the CPU 930 and the switch 910 interfaces between the interconnect 702 and each of the PPUs 700. The PPUs 700, memories 704, and interconnect 702 may be situated on a single semiconductor platform to form a parallel processing module 925. In at least one embodiment (not shown), the interconnect 702 provides one or more communication links between each of the PPUs 700 and the CPU 930 and the switch 910 interfaces between each of the PPUs 700 using the NVLink 710 to provide one or more high-speed communication links between the PPUs 700. In at least one embodiment (not shown), the NVLink 710 provides one or more high-speed communication links between the PPUs 700 and the CPU 930 through the switch 910. In yet at least one embodiment (not shown), the interconnect 702 provides one or more communication links between each of the PPUs 700 directly. One or more of the NVLink 710 high-speed communication links may be implemented as a physical NVLink interconnect or either an on-chip or on-die interconnect using the same protocol as the NVLink 710.

In the context of the present description, a single semiconductor platform may refer to a sole unitary semiconductor-based integrated circuit fabricated on a die or chip. The term single semiconductor platform may also refer to multichip modules with increased connectivity which simulate on-chip operation and make substantial improvements over using a conventional bus implementation. Of course, the various circuits or devices may also be situated separately or in various combinations of semiconductor platforms per the desires of the user. Alternately, the parallel processing module 925 may be implemented as a circuit board substrate and each of the PPUs 700 and/or memories 704 may be packaged devices. In at least one embodiment, the CPU 930, switch 910, and the parallel processing module 925 are situated on a single semiconductor platform.

In at least one embodiment, the signaling rate of each NVLink 710 is 20 to 25 Gigabits/second and each PPU 700 includes six NVLink 710 interfaces (as shown in FIG. 9B, five NVLink 710 interfaces are included for each PPU 700). Each NVLink 710 may provide a data transfer rate of 25 Gigabytes/second in each direction, with six links providing 700 Gigabytes/second. The NVLinks 710 can be used exclusively for PPU-to-PPU communication as shown in FIG. 9B, or some combination of PPU-to-PPU and PPU-to-CPU, when the CPU 930 also includes one or more NVLink 710 interfaces.

In at least one embodiment, the NVLink 710 allows direct load/store/atomic access from the CPU 930 to each PPU's 700 memory 704. In at least one embodiment, the NVLink 710 supports coherency operations, allowing data read from the memories 704 to be stored in the cache hierarchy of the CPU 930, reducing cache access latency for the CPU 930. In at least one embodiment, the NVLink 710 includes support for Address Translation Services (ATS), allowing the PPU 700 to directly access page tables within the CPU 930. One or more of the NVLinks 710 may also be configured to operate in a low-power mode.

Figure 9C:
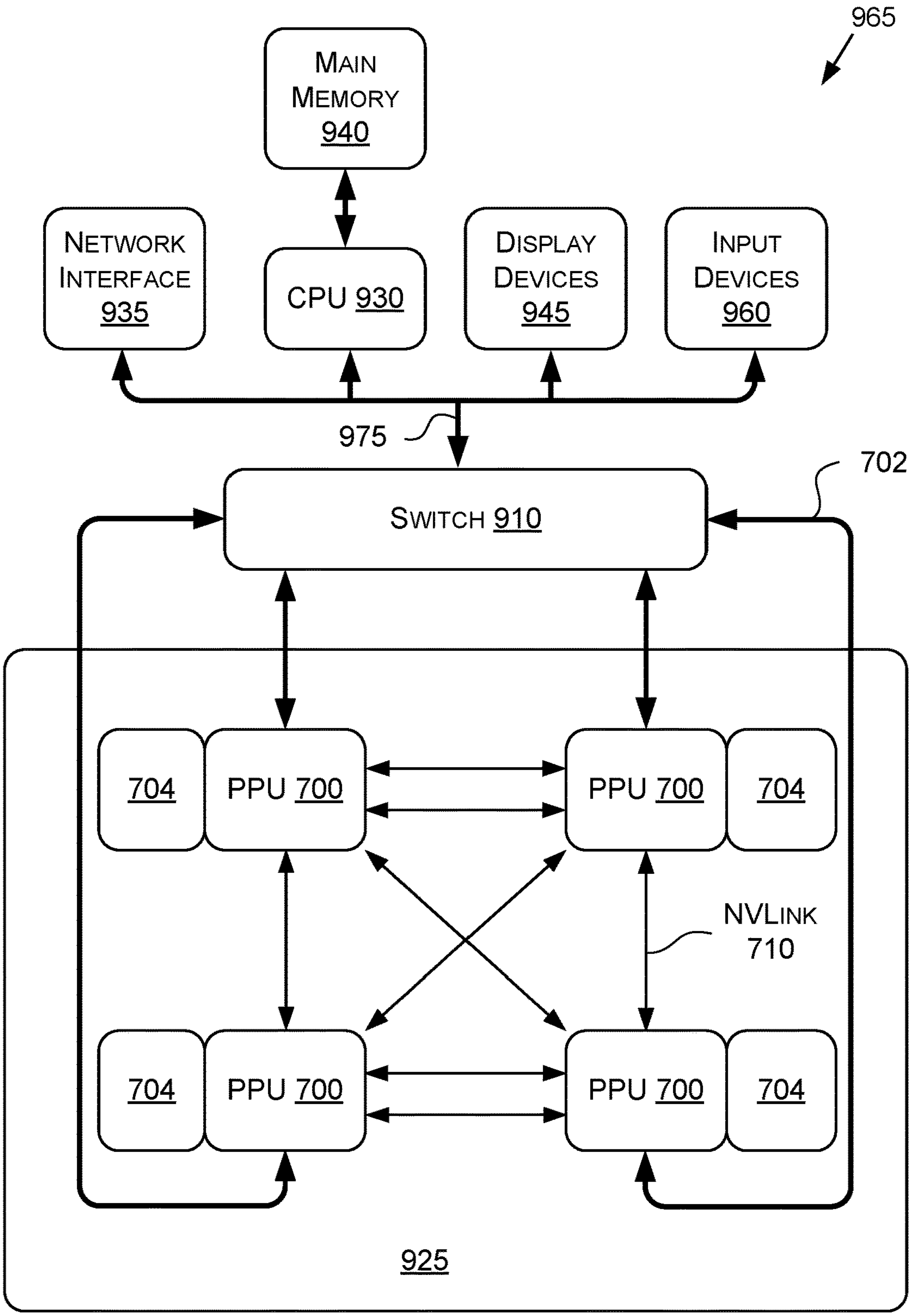
FIG. 9C illustrates an example system in which the various architecture and/or functionality of the various embodiments may be implemented.

FIG. 9C illustrates an example system 965 in which the various architecture and/or functionality of the various previous embodiments may be implemented suitable for use in implementing at least some embodiments of the present disclosure.

As shown, a system 965 is provided including at least one central processing unit 930 that is connected to a communication bus 975. The communication bus 975 may be implemented using any suitable protocol, such as PCI (Peripheral Component Interconnect), PCI-Express, AGP (Accelerated Graphics Port), HyperTransport, or any other bus or point-to-point communication protocol(s). The system 965 also includes a main memory 940. Control logic (software) and data are stored in the main memory 940 which may take the form of random access memory (RAM).

The system 965 also includes input devices 960, the parallel processing system 925, and display devices 945, e.g. a conventional CRT (cathode ray tube), LCD (liquid crystal display), LED (light emitting diode), plasma display or the like. User input may be received from the input devices 960, e.g., keyboard, mouse, touchpad, microphone, and the like. Each of the foregoing modules and/or devices may even be situated on a single semiconductor platform to form the system 965. Alternately, the various modules may also be situated separately or in various combinations of semiconductor platforms per the desires of the user.

Further, the system 965 may be coupled to a network (e.g., a telecommunications network, local area network (LAN), wireless network, wide area network (WAN) such as the Internet, peer-to-peer network, cable network, or the like) through a network interface 935 for communication purposes.

The system 965 may also include a secondary storage (not shown). The secondary storage may include, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive may read from and/or writes to a removable storage unit.

Computer programs, or computer control logic algorithms, may be stored in the main memory 940 and/or the secondary storage. Such computer programs, when executed, enable the system 965 to perform various functions. The memory 940, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 965 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Ray Tracing Pipeline

In at least one embodiment, the PPU 700 comprises a graphics processing unit (GPU). The PPU 700 may be configured to receive commands that specify shader programs for processing graphics data. Graphics data may be defined as a set of primitives such as points, lines, triangles, quads, triangle strips, and the like. A primitive may include data that specifies a number of vertices for the primitive (e.g., in a model-space coordinate system) as well as attributes associated with each vertex of the primitive. The PPU 700 may be configured to process the graphics primitives to generate a frame buffer (e.g., pixel data for each of the pixels of the display).

An application may write model data for a scene (e.g., a collection of vertices and attributes) to a memory such as a system memory or memory 704. The model data may define each of the objects that may be visible on a display. The application may then make an API call to the driver kernel that requests the model data to be rendered and displayed. The driver kernel may read the model data and write commands to the one or more streams to perform operations to process the model data. The commands may reference different shader programs to be implemented on the SMs 840 of the PPU 700. For example, different SMs 840 may be configured to execute different shader programs.

In at least one embodiment, the model data may be processed to perform one or more ray tracing operations, such as real-time tray tracing, to render the model data to a frame buffer. The contents of the frame buffer may be transmitted to a display controller for display on a display device. Ray tracing may refer to any of a variety of techniques for modeling or simulating light transport and/or other aspects of an environment, for example, for use in generating digital images or otherwise simulating the environment. Thus, while certain embodiments may be described with respect to light transport simulation, they may be applicable to simulating, modeling, and/or measuring any of a variety of aspects of an environment. Non-limiting examples of ray tracing include ray casting, recursive ray tracing, distribution ray tracing, photon mapping, and path tracing.

Ray tracing may be used to simulate a variety of optical effects-such as shadows, reflections, refractions, scattering phenomenon, ambient occlusions, global illuminations, or dispersion phenomenon (such as chromatic aberration). Ray tracing may involve generating ray-traced samples by casting rays in a virtual environment to sample lighting and/or other environmental conditions for pixels. The ray traced samples may be combined and used to determine pixel colors for an image. In at least one embodiment, to conserve computing resources, the lighting conditions may be sparsely sampled, resulting in noisy render data. Temporal accumulation may be used to increase the effective sample count by using information from previous frames. To produce a final render that approximates a render of a fully sampled scene, one or more denoising filters may by be applied to the noisy render data to reduce noise.

Many ray tracing algorithms may cast or shoot rays from a virtual camera, or eye, through a 2D viewing plane (e.g., a pixel plane) out into a 3D scene which may include one or more light sources. Some rays may directly reach the viewing plane from a light source, some may be blocked by an object in the scene causing shadows, and some may reflect or refract off an object before reaching the viewing plane. When the rays intersect objects, the color and lighting information at the points of intersection on object surfaces may contribute to various pixel color and illumination levels of pixels of the viewing plane. Different objects may have different surface properties that can cause them to reflect, refract, or absorb light in different ways, which may be accounted for in ray tracing. Rays may reflect off objects and hit other objects, or travel through the surfaces of transparent objects before reaching a light source, and the color and lighting information from all the intersected objects may contribute to the final pixel colors.

Figure 10:
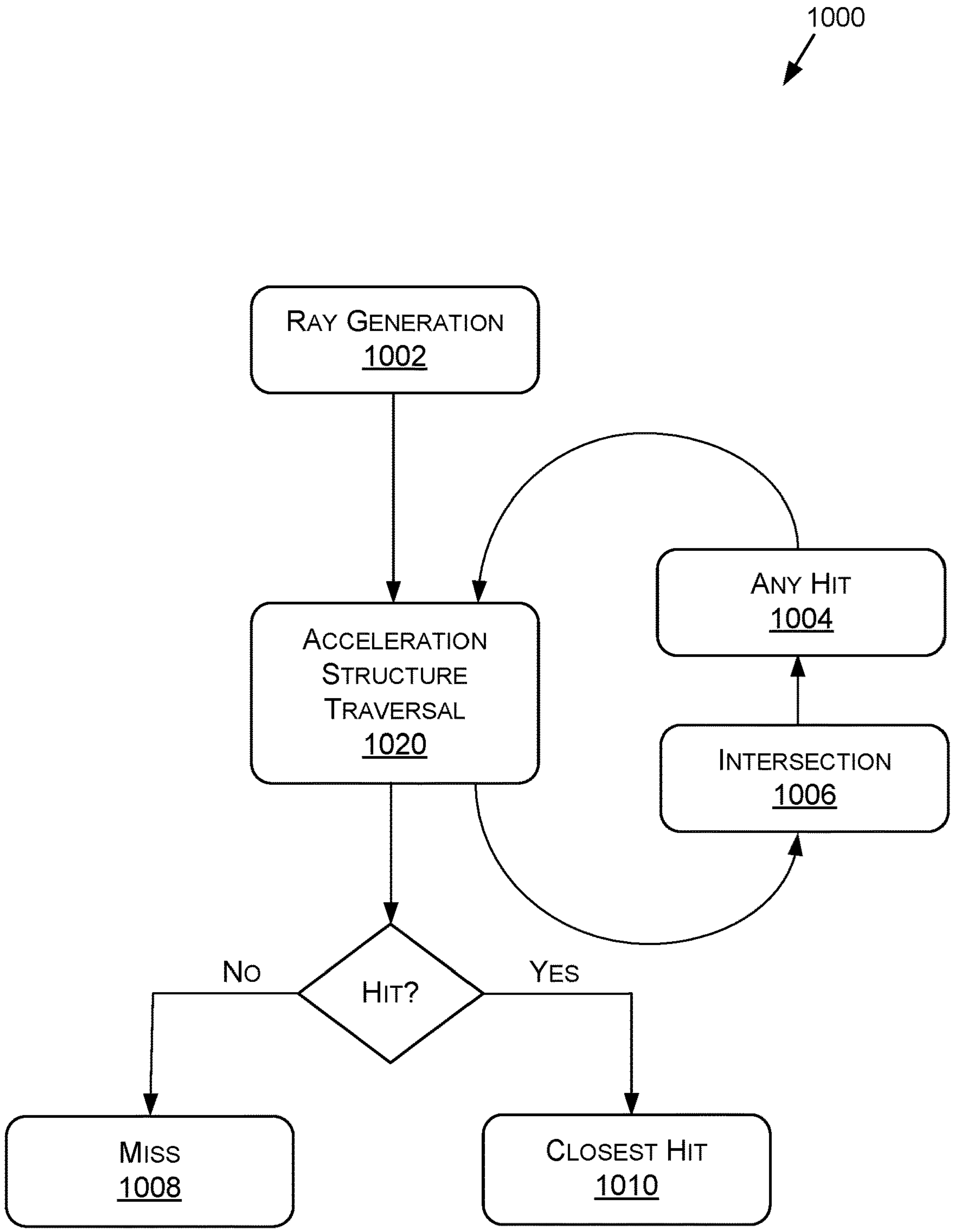
FIG. 10 illustrates an example ray tracing pipeline suitable for use in implementing at least some embodiments of the present disclosure.

FIG. 10 illustrates an example ray tracing pipeline 1000 suitable for use in implementing at least some embodiments of the present disclosure. By way of example, and not limitations, the ray tracing pipeline 1000 may be implemented by the PPU 700 of FIG. 7, in accordance with at least one embodiment. The ray tracing pipeline 1000 may include processing steps implemented to generate 2D computer-generated images from 3D geometry data using one or more ray tracing techniques.

In at least one embodiment, the ray tracing pipeline 1000 may be constructed using one or more ray generation shaders 1002, one or more any hit shaders 1004, one or more intersection shaders 1006, one or more miss shaders 1008, and/or one or more closest hit shaders 1010.

The ray tracing pipeline 1000 may be implemented via an application executed by a host processor, such as a CPU. In at least one embodiment, a device driver may implement an application programming interface (API) that defines various functions that can be used by an application in order to generate graphical data for display. The device driver may refer to a software program that includes instructions that control the operation of the PPU 700, or other PPU used to implement the ray tracing pipeline 1000. The API may provide an abstraction for a programmer that lets a programmer use specialized graphics hardware, such as the PPU 700, to generate the graphical data without requiring the programmer to use the specific instruction set for the PPU 700. The application may include an API call that is routed to the device driver for the PPU 700. The device driver may interpret the API call and perform various operations to respond to the API call. In at least one embodiment, the device driver performs operations by executing instructions on the CPU. In at least one embodiment, the device driver performs operations, at least in part, by launching operations on the PPU 700 using an input/output interface between the CPU and the PPU 700. In at least one embodiment, the device driver is configured to implement the ray tracing pipeline 1000 using the hardware of the PPU 700.

Various programs may be executed within the PPU 700 in order to implement the various stages of the ray tracing pipeline 1000. For example, the device driver may launch a kernel on the PPU 700 to execute a stage implementing a ray generation shader 1002 on an SM 840 (or multiple SMs 840). The device driver (or the initial kernel executed by the PPU 700) may also launch other kernels on the PPU 700 to execute other stages of the ray tracing pipeline 1000.

The ray generation shader 1002 may be the first shader involved in ray tracing dispatch. The ray generation shader 1002 may call a High Level Shader Language (HLSL) function called TraceRay( ). This TraceRay( ) function may cast a single ray into the scene to search for intersections, which may trigger other shaders in the process. In at least one embodiment, the ray generation shader 1002 may call TraceRay( ) any number of times.

An any hit shader 1004 and an intersection shader 1006 may be invoked whenever TraceRay( ) finds a potential intersection between the ray and the scene. The intersection shader 1006 may determine whether the ray intersects an individual geometric primitive—for example a sphere, a subdivision surface, a triangle, or other form of primitive. Once an intersection is found, the any hit shader 1004 may be used to process the intersection further or potentially discard the intersection. An any hit shader 1004 may, by way of example and not limitation, use alpha testing by performing a texture lookup and deciding based on the texel's value whether or not to discard an intersection.

Once TraceRay( ) has completed the search for ray-scene intersections, either a miss shader 1008 or a closest hit shader 1010 may be invoked, depending on the outcome of the search. The closest hit shader 1010 may perform most shading operations, such as, material evaluation, texture lookups, and so on. The miss shader 1008 may be used to implement environment lookups, for example. In at least one embodiment, one or more of the closest hit shader 1010 or the miss shader 1008 may recursively trace rays by calling TraceRay( ) themselves.

The ray tracing pipeline 1000 constructed from any of the various shaders described herein may define a single-ray programming model. In at least one embodiment, each thread of the PPU 700, and/or other PPU used to implement the ray tracing pipeline 1000, may handle one ray at a time. In at least one embodiment, each thread cannot communicate with other threads or see other rays currently being processed. This may simplify shader code, while allowing for vendor-specific optimizations using the API.

In at least one embodiment, different shaders and/or shader types may communicate with each other using a ray payload. A ray payload may refer to a user-defined struct that's passed as an INOUT parameter to TraceRay( ). For example, an any hit shader 1004, a closest hit shader 1010, and/or a miss shader 1008 may read from and/or write to the ray payload, and therefore pass back the result of their computations to the caller of TraceRay( ).

In at least one embodiment, a ray generation shader 1002 may trace primary rays, which may include rays being sent into the scene originating from a virtual camera. However, ray generation shaders 1002 are not limited to this functionality. In at least one embodiment, a ray generation shader 1002 may base ray generation on rasterized g-buffer data (e.g., to trace reflections). Using this approach, ray tracing may be used to complement rasterization, rather than replace rasterization.

When using traditional rasterization, only the shaders required by the current object being drawn may have to be active on the PPU. This may allow rasterization pipeline objects to be relatively small, containing a single set of vertex shaders, pixel shaders, etc. In contrast, a ray tracing pipeline 1000 may be used to arbitrarily shoot rays into the scene. This may mean the rays could hit any object or many objects in the scene. Therefore, it may be the case that all shaders for all objects could potentially be hit and therefore it may be desirable for the shaders to all be resident on the PPU and ready for execution.

In at least one embodiment, a state object may be used to group shaders together for execution. At a high level, a state object of a ray tracing pipeline 1000 may be seen as a binary executable resulting from a link step across all the shaders compiled for the scene. The relationship between different shaders may be specified at state object creation. For example, triplets of intersection shaders 1006, any hit shaders 1004, and/or closest hit shaders 1010 may be bundled into hit groups. The application may specify the state object of the ray tracing pipeline 1000 to be executed when calling a DispatchRays( ) function on a command list. A DispatchRays( ) function may invoke a ray generation shader 1002 for each pixel for an image. In at least one embodiment, an application may create any number of state objects for a ray tracing pipeline 1000 and may reuse precompiled shaders for this purpose.

Figure 11:
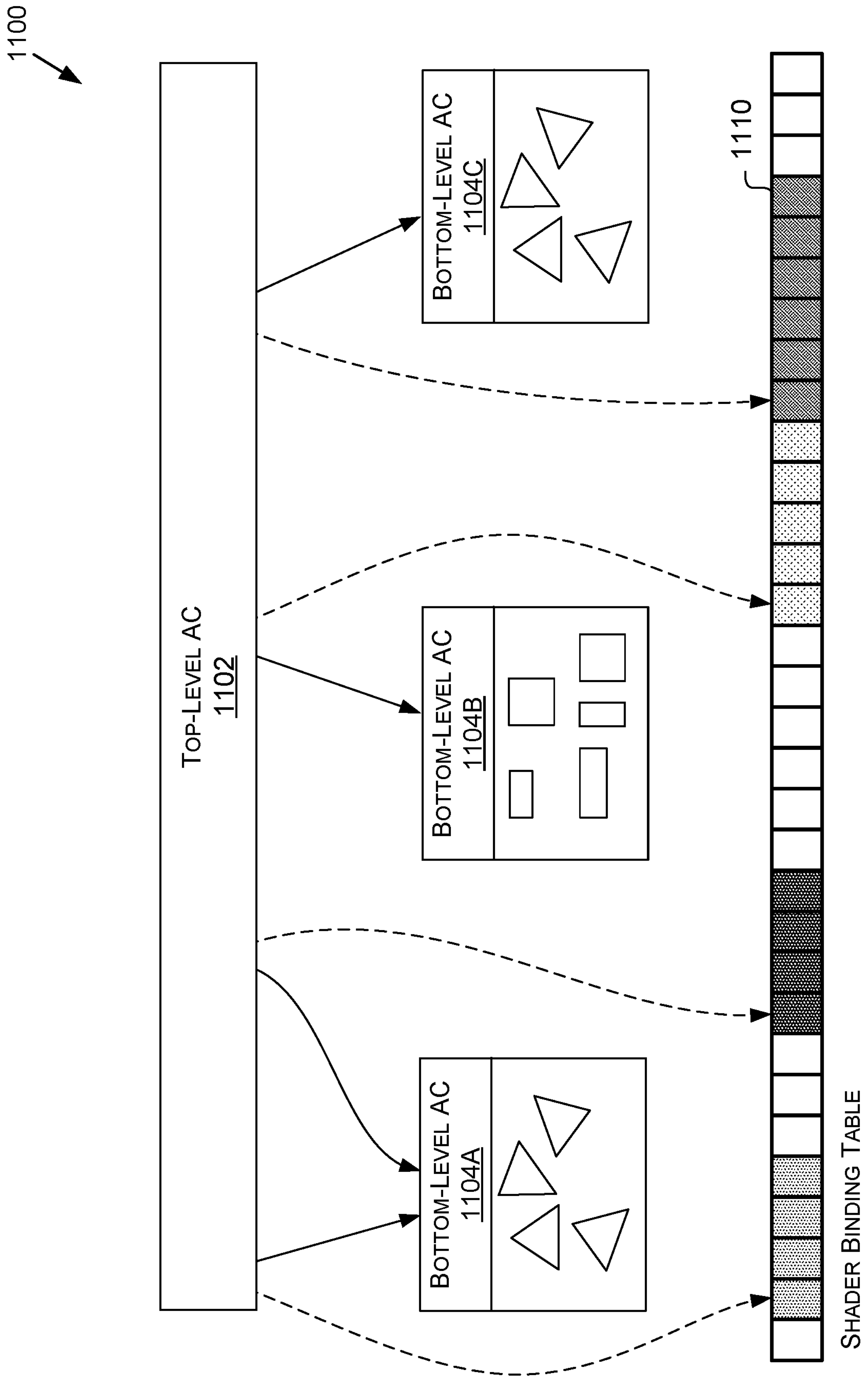
FIG. 11 illustrates an example acceleration structure suitable for use in implementing at least some embodiments of the present disclosure.

Referring now to FIG. 11, FIG. 11 illustrates an example acceleration structure 1100 suitable for use in implementing at least some embodiments of the present disclosure. The acceleration structure 1100 includes one or more top-level acceleration structures, such as a top-level acceleration structure 1102, and one or more bottom-level acceleration structures, such as bottom-level acceleration structures 1104A, 1104B, and 1104C.

The acceleration structure 1100 may comprise a spatial search data structure used in a ray tracing pipeline 1000 for acceleration structure traversal 1020 to efficiently compute intersections of rays with scene geometry. In at least one embodiment, the application may build an acceleration structure 1100 explicitly using a command list method BuildRaytracingAccelerationStructure( ). In at least one embodiment, the application may optimize an acceleration structure 1100 for different types of content, such as static versus animated content.

A top-level acceleration structure 1102 may be built from one or more references to one or more bottom-level acceleration structures 1104A, 1104B, and/or 1104C. These references may be referred to as instance descriptors. Each instance descriptor may include a transformation matrix to position the instance descriptor in the scene, and an offset into a shader table 1110 (which may also be referred to as a "shader binding table") to locate material information. In at least one embodiment, a top-level acceleration structure 1102 may be used as a scene parameter provided to TraceRay( ) in a ray generation shader 1002, and may represent an entry point of the intersection search.

A ray tracing pipeline 1000 may specify the shaders that exist in a scene and an acceleration structure 1100 may specify geometry for the scene. The shader table 1110 may refer to a data structure used to tie the geometry to the shaders. For example, the shader table 1110 may define which shader is associated with which object in the scene. In addition, the shader table 1110 may hold information about the resources accessed by each shader, such as textures, buffers, and constants.

A shader table 1110 may comprise a chunk of PPU memory, which may be managed by the application. The application may be responsible for allocating the resource, filling the shader table 1110 with valid data, transferring it to the PPU, and correctly synchronizing the shader table 1110 with ray tracing dispatches. The application may also maintain multiple shader tables 1110, and, for example, multi-buffer them to update one copy while using another for rendering.

A shader table 1110 may comprise an array of equal-sized shader records. Each shader record may associate a shader (or a hit group) with a set of resources. In at least one embodiment, there may exist one record per geometry object in the scene, and a shader table 1110 may include thousands of entries or more.

Figure 12:
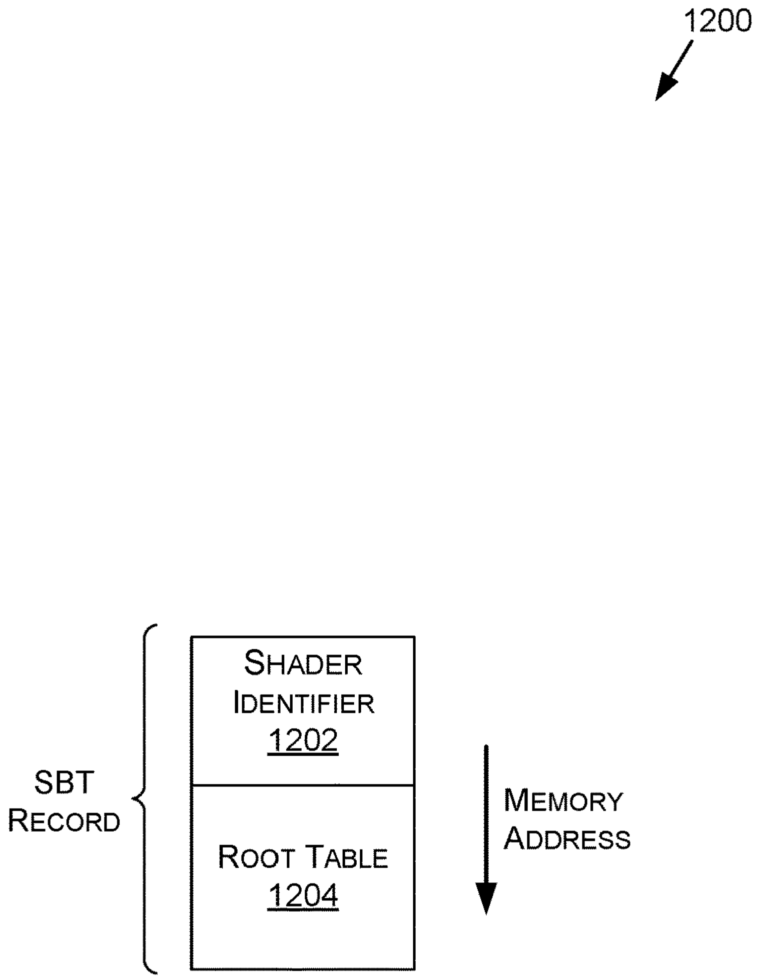
FIG. 12 illustrates an example shader record suitable for use in implementing at least some embodiments of the present disclosure.

Referring now to FIG. 12, FIG. 12 illustrates an example shader record 1200 suitable for use in implementing at least some embodiments of the present disclosure. The shader record 1200 is an example of a shader record that may be included in the shader table 1110 of FIG. 11. The shader record 1200 includes a shader identifier 1202 and a root table 1204.

In at least one embodiment, the shader identifier 1202 may be represented in a beginning portion of the shader record 1200 in memory. The shader identifier 1202 may be an opaque identifier, which the application obtains by querying for the shader identifier 1202 from a compiled shader. The root table 1204 may contain the shader's resources. The layout of the root table 1204 may be defined by the shader's local root signature. The root signature may contain any combination of constants, descriptor tables, and root descriptors. For ray tracing, the application may directly access the root table 1204 in memory (e.g., rather than using "setter" methods), which may allow for efficient updates. In at least one embodiment, a shader table 1110 may be updated from a PPU shader.

As described herein, shader table offsets may be used when building a top-level acceleration structure 1102 from instance descriptors. The system may use these offsets to locate the correct shader record 1200 whenever TraceRay( ) finds an intersection. The system may then bind the resources defined in the shader record 1200 and execute the appropriate shader for the intersected geometry.

Example Computing Device

Figure 13:
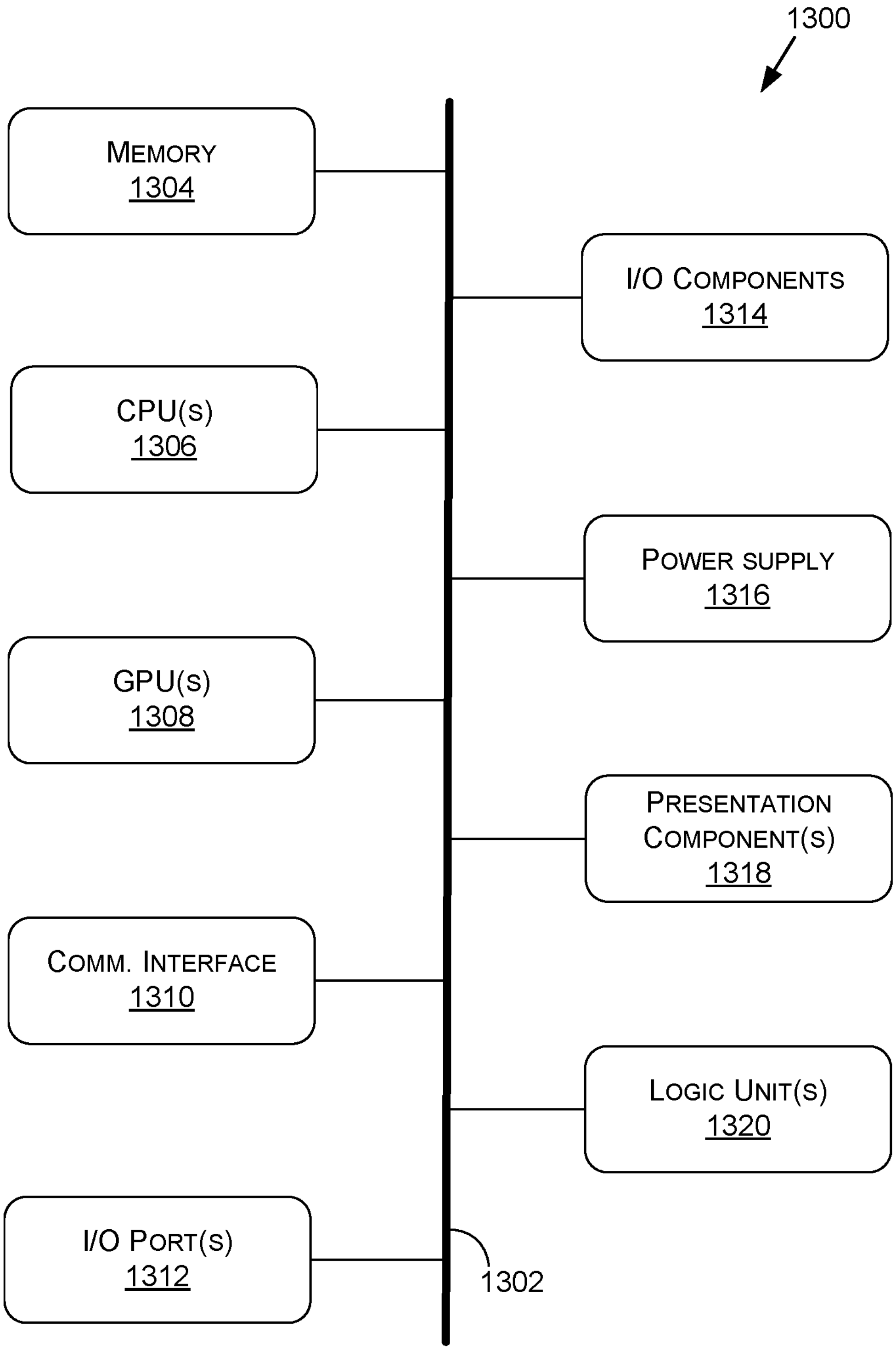
FIG. 13 is a block diagram of an example computing device suitable for use in implementing some embodiments of the present disclosure.

FIG. 13 is a block diagram of an example computing device(s) 1300 suitable for use in implementing at least some embodiments of the present disclosure. Computing device 1300 may include an interconnect system 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, one or more presentation components 1318 (e.g., display(s)), and one or more logic units 1320. In at least one embodiment, the computing device(s) 1300 may comprise one or more virtual machines (VMs), and/or any of the components thereof may comprise virtual components (e.g., virtual hardware components). For non-limiting examples, one or more of the GPUs 1308 may comprise one or more pups, one or more of the CPUs 1306 may comprise one or more vCPUs, and/or one or more of the logic units 1320 may comprise one or more virtual logic units. As such, a computing device(s) 1300 may include discrete components (e.g., a full GPU dedicated to the computing device 1300), virtual components (e.g., a portion of a GPU dedicated to the computing device 1300), or a combination thereof.

Although the various blocks of FIG. 13 are shown as connected via the interconnect system 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 13.

The interconnect system 1302 may represent one or more links or busses, such as an address bus, a data bus, a control bus, or a combination thereof. The interconnect system 1302 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1306 may be directly connected to the memory 1304. Further, the CPU 1306 may be directly connected to the GPU 1308. Where there is direct, or point-to-point connection between components, the interconnect system 1302 may include a PCIe link to carry out the connection. In these examples, a PCI bus need not be included in the computing device 1300.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information, and which may be accessed by computing device 1300. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute at least some of the computer-readable instructions to control one or more components of the computing device 1300 to perform one or more of the methods and/or processes described herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor and may include different types of processors depending on the type of computing device 1300 implemented (e.g., processors with fewer cores for mobile devices and processors with more cores for servers). For example, depending on the type of computing device 1300, the processor may be an Advanced RISC Machines (ARM) processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

In addition to or alternatively from the CPU(s) 1306, the GPU(s) 1308 may be configured to execute at least some of the computer-readable instructions to control one or more components of the computing device 1300 to perform one or more of the methods and/or processes described herein. One or more of the GPU(s) 1308 may be an integrated GPU (e.g., with one or more of the CPU(s) 1306 and/or one or more of the GPU(s) 1308 may be a discrete GPU. In embodiments, one or more of the GPU(s) 1308 may be a coprocessor of one or more of the CPU(s) 1306. The GPU(s) 1308 may be used by the computing device 1300 to render graphics (e.g., 3D graphics) or perform general purpose computations. For example, the GPU(s) 1308 may be used for General-Purpose computing on GPUs (GPGPU). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data or any other suitable data, such as GPGPU data. The display memory may be included as part of the memory 1304. The GPU(s) 1308 may include two or more GPUs operating in parallel (e.g., via a link). The link may directly connect the GPUs (e.g., using NVLINK) or may connect the GPUs through a switch (e.g., using NVSwitch). When combined together, each GPU 1308 may generate pixel data or GPGPU data for different portions of an output or for different outputs (e.g., a first GPU for a first image and a second GPU for a second image). Each GPU may include its own memory or may share memory with other GPUs.

In addition to or alternatively from the CPU(s) 1306 and/or the GPU(s) 1308, the logic unit(s) 1320 may be configured to execute at least some of the computer-readable instructions to control one or more components of the computing device 1300 to perform one or more of the methods and/or processes described herein. In embodiments, the CPU(s) 1306, the GPU(s) 1308, and/or the logic unit(s) 1320 may discretely or jointly perform any combination of the methods, processes and/or portions thereof. One or more of the logic units 1320 may be part of and/or integrated in one or more of the CPU(s) 1306 and/or the GPU(s) 1308 and/or one or more of the logic units 1320 may be discrete components or otherwise external to the CPU(s) 1306 and/or the GPU(s) 1308. In embodiments, one or more of the logic units 1320 may be a coprocessor of one or more of the CPU(s) 1306 and/or one or more of the GPU(s) 1308.

Examples of the logic unit(s) 1320 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1310 may include one or more receivers, transmitters, and/or transceivers that enable the computing device 1300 to communicate with other computing devices via an electronic communication network, included wired and/or wireless communications. The communication interface 1310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1320 and/or communication interface 1310 may include one or more data processing units (DPUs) to transmit data received over a network and/or through interconnect system 1302 directly to (e.g., a memory of) one or more GPU(s) 1308.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof. The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, DPUs, etc.), and output the data (e.g., as an image, video, sound, etc.).

Example Data Center

Figure 14:
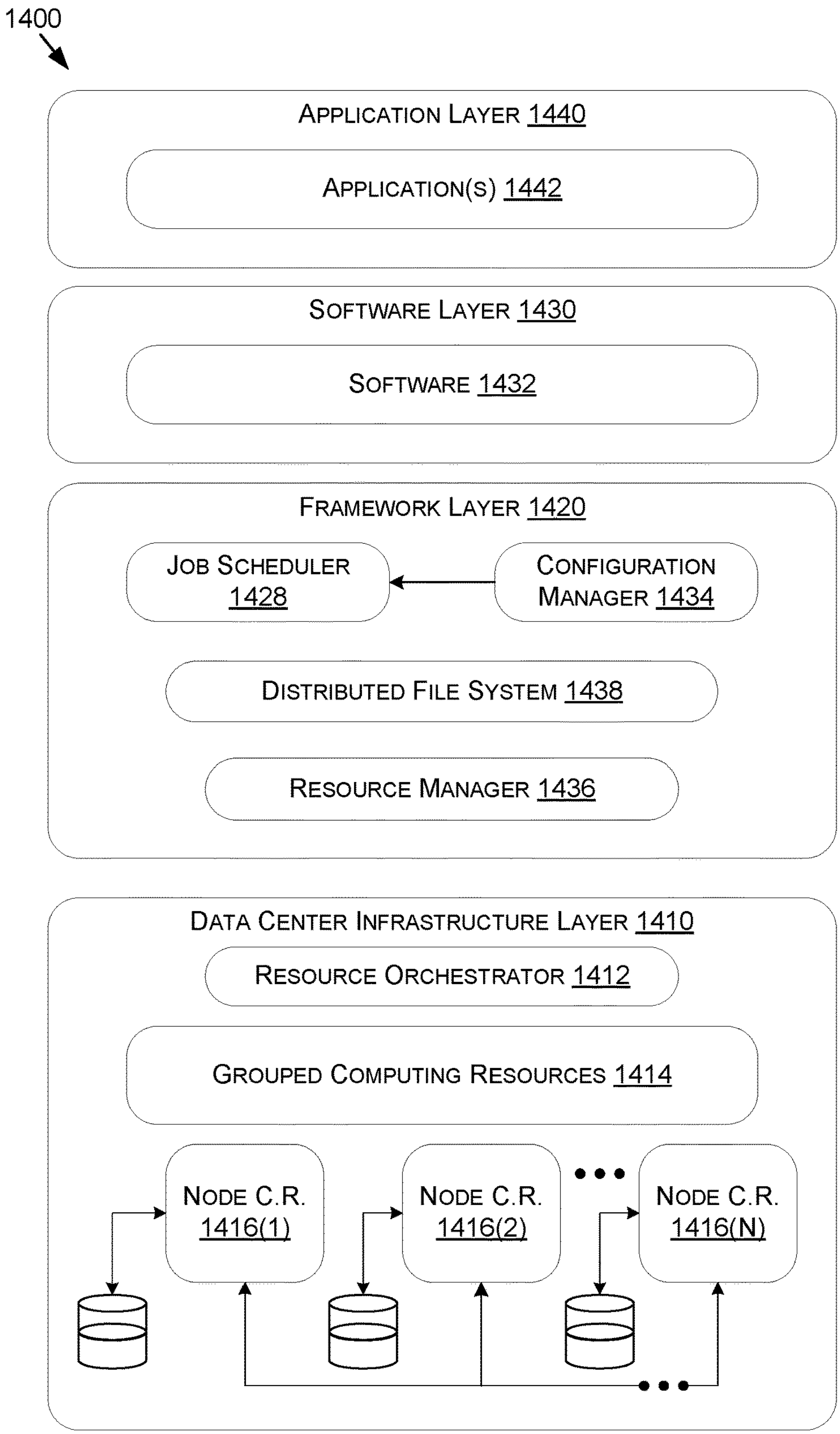
FIG. 14 is a block diagram of an example data center suitable for use in implementing some embodiments of the present disclosure.

FIG. 14 illustrates an example data center 1400 that may be used in at least one embodiments of the present disclosure. The data center 1400 may include a data center infrastructure layer 1410, a framework layer 1420, a software layer 1430, and/or an application layer 1440.

As shown in FIG. 14, the data center infrastructure layer 1410 may include a resource orchestrator 1412, grouped computing resources 1414, and node computing resources ("node C.R.s") 1416(1)-1416(N), where "N" represents any whole, positive integer. In at least one embodiment, node C.R.s 1416(1)-1416(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1416(1)-1416(N) may correspond to a server having one or more of the above-mentioned computing resources. In addition, in some embodiments, the node C.R.s 1416(1)-14161 (N) may include one or more virtual components, such as vGPUs, vCPUs, and/or the like, and/or one or more of the node C.R.s 1416(1)-1416(N) may correspond to a virtual machine (VM).

In at least one embodiment, grouped computing resources 1414 may include separate groupings of node C.R.s 1416 housed within one or more racks (not shown), or many racks housed in data centers at various geographical locations (also not shown). Separate groupings of node C.R.s 1416 within grouped computing resources 1414 may include grouped compute, network, memory or storage resources that may be configured or allocated to support one or more workloads. In at least one embodiment, several node C.R.s 1416 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1412 may configure or otherwise control one or more node C.R.s 1416(1)-1416(N) and/or grouped computing resources 1414. In at least one embodiment, resource orchestrator 1412 may include a software design infrastructure (SDI) management entity for the data center 1400. The resource orchestrator 1412 may include hardware, software, or some combination thereof.

In at least one embodiment, as shown in FIG. 14, framework layer 1420 may include a job scheduler 1428, a configuration manager 1434, a resource manager 1436, and/or a distributed file system 1438. The framework layer 1420 may include a framework to support software 1432 of software layer 1430 and/or one or more application(s) 1442 of application layer 1440. The software 1432 or application(s) 1442 may respectively include web-based service software or applications, such as those provided by Amazon Web Services, Google Cloud and Microsoft Azure. The framework layer 1420 may be, but is not limited to, a type of free and open-source software web application framework such as Apache Spark™ (hereinafter "Spark") that may utilize distributed file system 1438 for large-scale data processing (e.g., "big data"). In at least one embodiment, job scheduler 1428 may include a Spark driver to facilitate scheduling of workloads supported by various layers of data center 1400. The configuration manager 1434 may be capable of configuring different layers such as software layer 1430 and framework layer 1420 including Spark and distributed file system 1438 for supporting large-scale data processing. The resource manager 1436 may be capable of managing clustered or grouped computing resources mapped to or allocated for support of distributed file system 1438 and job scheduler 1428. In at least one embodiment, clustered or grouped computing resources may include grouped computing resource 1414 at data center infrastructure layer 1410. The resource manager 1436 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1438 of framework layer 1420. One or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416 (1)-1416(N), grouped computing resources 1414, and/or distributed file system 1438 of framework layer 1420. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1434, resource manager 1436, and resource orchestrator 1412 may implement any number and type of self-modifying actions based on any amount and type of data acquired in any technically feasible fashion. Self-modifying actions may relieve a data center operator of data center 1400 from making possibly bad configuration decisions and possibly avoiding underused and/or poor performing portions of a data center.

The data center 1400 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1400. In at least one embodiment, trained or deployed machine learning models corresponding to one or more neural networks may be used to infer or predict information using resources described above with respect to the data center 1400 by using weight parameters calculated through one or more training techniques, such as but not limited to those described herein.

In at least one embodiment, the data center 1400 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1300 of FIG. 13—e.g., each device may include similar components, features, and/or functionality of the computing device(s) 1300. In addition, where backend devices (e.g., servers, NAS, etc.) are implemented, the backend devices may be included as part of a data center 1400, an example of which is described in more detail herein with respect to FIG. 14.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1300 described herein with respect to FIG. 13. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

projecting spatial elements of a scene into multi-dimensional bins that correspond to a spatial partitioning of the scene to generate one or more values indicating relative locations of the spatial elements along one or more dimensions of the multi-dimensional bins;

selecting one or more first split planes defining a partition of the spatial elements and a corresponding subset of the multi-dimensional bins based at least on evaluating, using the one or more values, the relative locations of the spatial elements with respect to one or more sides of the one or more first split planes along the one or more dimensions;

selecting one or more second split planes defining a subpartition of the partition of the spatial elements based at least on evaluating, using the one or more values, a subset of the relative locations that corresponds to the corresponding subset of the multi-dimensional bins with respect to one or more sides of the one or more second split planes along the one or more dimensions;

assigning at least one spatial element of the spatial elements to a node corresponding to a hierarchical partitioning of the spatial elements based at least on the subpartition; and rendering an image of the scene by performing one or more light transport simulation techniques using the hierarchical partitioning.

2. The method of claim 1, wherein the node is a child node of a parent node that corresponds to at least one of the partition or one or more of the spatial elements.

3. The method of claim 1, wherein the one or more first split planes are along a first dimension of the multi-dimensional bins and the one or more second split planes are along a second dimension of the multi-dimensional bins.

4. The method of claim 1, wherein the selecting of the one or more first split planes is based at least on a first cost value computed for the partition using the one or more values, and the selecting of the one or more second split planes is based at least on a second cost value computed for the subpartition using a subset of the one or more values that corresponds to the corresponding subset of the multi-dimensional bins.

5. The method of claim 4, wherein the one or more values indicate, for each bin of the multi-dimensional bins along the one or more dimensions, a count of the spatial elements assigned to the bin and an aggregation of bounding boxes of the spatial elements assigned to the bin.

6. The method of claim 1, wherein the one or more values quantify a spatial distribution of the spatial elements across the multi-dimensional bins and along the one or more dimensions.

7. The method of claim 1, wherein the projecting, the selecting of the one or more first split planes, the selecting of the one or more second split planes, the evaluating the relative locations, and the evaluating the subset of the relative locations are performed using a single read of location information of the spatial elements from memory.

8. The method of claim 1, wherein the performing the one or more light transport simulation techniques comprises a ray intersection test with geometry in the scene using the hierarchical partitioning of the spatial elements as an acceleration structure.

9. A system comprising:

one or more processors to perform operations including:

determining one or more values indicating relative locations of spatial elements of a scene along one or more dimensions of multi-dimensional bins that correspond to a spatial partitioning of the scene;

selecting one or more first split planes defining a partition of the spatial elements based at least on evaluating, using the one or more values, the relative locations of the spatial elements with respect to one or more sides of the one or more first split planes along the one or more dimensions;

selecting one or more second split planes defining a subpartition of the partition based at least on evaluating, using the one or more values, a subset of the relative locations that corresponds to the partition with respect to one or more sides of the one or more second split planes along the one or more dimensions;

assigning at least one spatial element of the spatial elements to a node corresponding to the subpartition in a hierarchical partitioning of the spatial elements; and using the hierarchical partitioning to accelerate an application of at least one light transport simulation technique to render one or more images of the scene.

10. The system of claim 9, wherein the node is a child node of a parent node that corresponds to the partition.

11. The system of claim 9, wherein the evaluating the relative locations includes computing a first respective spatial cost for each side of the one or more first split planes along the one or more dimensions, and the evaluating the subset of the relative locations includes computing a second respective spatial cost for each side of the one or more second split planes along the one or more dimensions.

12. The system of claim 9, wherein the one or more values indicate, for each bin of a plurality of bins along one or more dimensions of the multi-dimensional bins, a multi-dimensional bounding box corresponding to an aggregate bounding box of a plurality of the spatial elements assigned to the bin.

13. The system of claim 9, wherein the multi-dimensional bins include at least an x-dimension, a y-dimension, and a z-dimension.

14. The system of claim 9, wherein the at least one light transport simulation technique comprises a ray intersection test with geometry in the scene using the hierarchical partitioning of the spatial elements as an acceleration structure.

15. The system of claim 9, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implementing one or more large language models (LLMs);

a system implemented using an edge device;

a system implemented using a machine;

a system for performing conversational AI operations;

a system for generating synthetic data;

a system incorporating one or more virtual machines (VMs);

a system implemented at least partially in a data center; or a system implemented at least partially using cloud computing resources.

16. At least one processor comprising:

one or more circuits to assign at least one spatial element of spatial elements of a scene to a node corresponding to a hierarchical partitioning of the spatial elements based at least on a subpartition of a partition of the spatial elements, the subpartition being determined based at least on:

projecting the spatial elements into multi-dimensional bins that correspond to a spatial partitioning of the scene to generate one or more values indicating relative locations of the spatial elements along one or more dimensions of the multi-dimensional bins;

determining the partition of the spatial elements based at least on evaluating, using the one or more values, the relative locations of the spatial elements with respect to one or more sides of one or more first split planes along the one or more dimensions; and splitting the partition based at least on evaluating, using the one or more values, a subset of the relative locations that corresponds to the partition with respect to one or more sides of one or more second split planes along the one or more dimensions.

17. The at least one processor of claim 16, wherein the evaluating the relative locations is with respect to each side of the one or more first split planes along the one or more dimensions, and the evaluating the subset of the relative locations is with respect to each side of the one or more second split planes along the one or more dimensions.

18. The at least one processor of claim 16, wherein:

the evaluating the relative locations includes accessing memory locations that store the one or more values to retrieve the one or more values and compute one or more first cost values corresponding to the partition using the retrieved one or more values, and the evaluating the subset of the relative locations includes accessing a subset of the memory locations that store a subset of the one or more values to retrieve the subset of the one or more values and compute one or more second cost values corresponding to the subpartition using the retrieved subset of the one or more values.

19. The at least one processor of claim 16, wherein the one or more circuits are to, based at least on a quantity of bins in a second subset of the multi-dimensional bins that corresponds to the subpartition:

project a second subset of the spatial elements that correspond to the subpartition into second multi-dimensional bins that correspond to a second spatial partitioning of the scene to determine second assignments between the second subset of the spatial elements and the second multi-dimensional bins;

determine, using the second assignments and the second multi-dimensional bins, a second partition of the second subset of the spatial elements; and assign one or more of the spatial elements to a second node corresponding to the hierarchical partitioning based at least on the second partition of the second subset of the spatial elements.

20. The at least one processor of claim 16, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implementing one or more large language models (LLMs);

a system implemented using an edge device;

a system implemented using a machine;

a system for performing conversational AI operations;

a system for generating synthetic data;

a system incorporating one or more virtual machines (VMs);

a system implemented at least partially in a data center; or a system implemented at least partially using cloud computing resources.

* * * * *